US006384932B1

(12) United States Patent
Fujisawa et al.

(10) Patent No.: US 6,384,932 B1
(45) Date of Patent: May 7, 2002

(54) DIGITAL IMPOSITIONING APPARATUS

(75) Inventors: Kyohei Fujisawa; Takanori Kitani; Katsumichi Miyamoto, all of Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 09/137,830

(22) Filed: Aug. 21, 1998

(30) Foreign Application Priority Data

Aug. 28, 1997 (JP) .......... 9-232775
Oct. 3, 1997 (JP) .......... 9-271632
May 29, 1998 (JP) .......... 10-149519

(51) Int. Cl.[7] .......... G06F 3/12
(52) U.S. Cl. .......... 358/1.18; 358/1.9
(58) Field of Search .......... 358/1.1, 1.9, 1.12, 358/1.13, 1.14, 1.15, 1.16, 1.18, 1.11, 1.5; 347/71, 72, 111, 171, 188

(56) References Cited

U.S. PATENT DOCUMENTS 5,857,209 A * 1/1999 Shively .......... 707/500
5,875,288 A * 2/1999 Bronstein et al. .......... 358/1.9

* cited by examiner

*Primary Examiner*—Mark Wallerson
(74) *Attorney, Agent, or Firm*—McDermott, Will & Emery

(57) ABSTRACT

A digital impositioning apparatus performs impositioning using file output of electronic data instead of film output. An impositioning portion 12 creates imposition data for each page based on arrangement information. Here, in order to conform to the type of a printer 31, the impositioning portion 12 rewrites as required the arrangement information by an instruction from a terminal 21 to create suitable imposition data. A joining portion 13 positions the above imposition data so as to be optimally arranged on a printing plate. This positioning can be performed as being checked on a screen of the terminal 21. The print information adding portion 14 reads from outside and arranges accessories required for printing. A dot generating portion 17 converts a rasterized file after the above data processing from raster style data for each page to dot data organizing a plurality of pages, in consideration of dot gain adjustment from a control peroration 15. Thus, it is possible to achieve labor savings in Plate Making/Printing process as well as improvement in printing accuracy.

14 Claims, 23 Drawing Sheets

| PAGE No. | ORIGIN COORDINATES x | ORIGIN COORDINATES y | DIAGONAL COORDINATES Δ x | DIAGONAL COORDINATES Δ y | PAGE SURFACE | ROTATION | ------ |
|---|---|---|---|---|---|---|---|
| 1 | 10 | 10 | +300 | +300 | TOP | 0° | |
| 2 | 320 | 10 | +300 | +300 | TOP | 0° | |
| 3 | 630 | 10 | +400 | +300 | TOP | 180° | |
| ------- | ------- | ------- | ------- | ------- | ------- | ------- | ------- |

FIG. 14

| | | | | | | | | | | | |
|---|---|---|---|---|---|---|---|---|---|---|---|
| PRESENT DOT DENSITY | 0 | 1 | ---- | 10 | ---- | 40 | --------- | 70 | ----- | 99 | 100 |
| DOT DENSITY AFTER CORRECTION | 10 | 11 | ---- | 20 | ---- | 50 | --------- | 80 | ----- | 100 | 100 |

DIGITAL IMPOSITIONING APPARATUS

BACKGROUND OF THE INVENTION

1. Field of the Invention

The present invention relates to digital impositioning apparatus, and specifically to a digital impositioning apparatus for performing digital impositioning in Plate Making/Printing process using digital data output from Prepress process.

2. Related Art Statement

As known, Design process, Prepress process and Plate Making/Printing process are required to complete planning contents ordered by a client as printed matter. Created in Design process is a mechanical designed along the planning contents. Created in Prepress process is a film in which pictures, lines, character strings are arranged based on the mechanical and laid out. In Plate Making/Printing process, impositioning based on the film is performed to make a printing plate, and then printed matter is completed by printing.

In these processes, data processing from Design process to Prepress process has been changed from analog processing to digital processing represented by DTP (Desk Top Publishing) due to the recent widespread use of computer technology and various prepress processing software, allowing rationalization of operations. This rationalization allows designing and editing on the data digitized by DTP processing, and thereby it is possible to output digital mechanical data. In Prepress process, based on the above digital mechanical data, digital operation processing as required such as Prepress process (Trap processing and the like), RIP (Raster Image Processing) and the like after arranging digital data of pictures, lines, and character strings is executed to obtain digital page data, and a film of a prescribed size and color proof are outputted.

On the other hand, in Plate Making/Printing process, the following processing is performed in an analog fashion after receiving the film outputted from Prepress process.

Performed first is impositioning such as joining of the films received from Prepress process (different films are joined so as to be structured on one printing plate) and the like. Next, after superposing the joined films and an unexposed printing plate, exposure processing is performed to expose pictures, lines and the like on the printing plate. Then, the plate after this exposure processing is set in a printer to print on a printing paper.

After the above described operation, printed matter is completed. However, practically, there are cases where ink density of the data on the printing plate for printing (pictures, characters, tints, and the like), weather conditions (temperature, humidity and the like), secular deterioration, quality of printing papers (elasticity and the like), or the like causes fine displacements of positions of each separation (Y, M, C, K and special color) of the printed matter or partial interference between colors (inks). Furthermore, there are cases where changes of total balance in tone of the printed matter, the needs from the client, or prepress mistakes occurs. These factors often perform re-impositioning by another fine adjustment of data positions and tone on the printing plate before the final printed matter completes.

Among re-operations of the above impositioning, fine adjustment of the data positions on the printing plate is called offset adjustment, being performed by re-joining the films. On the other hand, fine adjustment of tone of data on the printing plate is called exposure adjustment, being performed by masking a page data area or a component (pictures, characters and the like in a page) area in a film at the time of re-exposure on the printing plate to partially change exposure time.

As described above, data passing from Prepress process to Plate Making/Printing process still uses a medium, that is, a film (refer to FIG. 22). In this way, one of the reasons why films are still used as a medium is that Prepress process and Plate Making/Printing process are independent in most cases (that is, Prepress process and Plate Making/Printing process are processed by different companies in most cases). Another reason is that use of films can clearly differentiate operations of Prepress process from operations of Plate Making/Printing process, thereby advantageously defining a share of responsibility. Furthermore, in Plate Making/Printing process, it is possible to perform impositioning under bookbinding rules so as to finish one piece of printed matter with correct pagination when folded based on right-open or left-open. Therefore when correction of the printing plate and the like occur, problems can be advantageously solved only in Plate Making/Printing process.

However, it is impossible to achieve reduction in a process between Prepress process and Plate Making/Printing process as long as a film is used as a medium, and also it is impossible to achieve reduction in prepress costs because the inconvenience of film making and film costs always occur.

Therefore, in recent years, a method called CTP (Computer to Plate) is thought as a method, not through the medium of a film between Prepress process and Plate Making/Printing process, of cutting/rationalizing the process therebetween . A conventional processing system using this CTP method is shown in FIG. 23. In the CTP method, impositioning originally included in Plate Making/Printing process is included in Prepress process, and processing up to impositioning is performed in digital operation processing of Prepress process. Then, rasterized data subjected to up to impositioning is screened to directly make a printing plate. This relieves the existence of the medium of the film between Prepress process and Plate Making/Printing process, and thus it is possible to achieve delivery time savings, reduction in prepress costs and the like due to reduction in the processing processes and removal of inconveniences of film making in Prepress process However, when the above CTP method is used for reduction and rationalization of Prepress process and Plate Making/Printing process, no intermediate medium such as a film exists and impositioning is included in Prepress process. Therefore, in the system using the above CTP method, the following problems arise in reality for a reason such as that a prescribed correcting operation which has been possible only in Plate Making/Printing process has to involve Prepress process and the like.

(1) In a step of digital operation processing in Prepress process, a printer must be specified for use in Plate Making/Prepress process.

This is because a printing plate is directly made from operation data, and thus the operation data must have matched with the printer. Therefore, although a prepress firm has only outputted a film as a final output without necessity to specify a printer, a new problem occurs that the firm has to specify a printer before calculation processing before operation processing.

(2) It is required to provide a reliable proof method.

Like proof when a film is used as a medium (chemical proof using a film and proof by a proof machine after plate making), it is required to establish a digital proof method on digital data.

(3) When correction occurs in Plate Making/Printing process, it is required to return to Prepress process again and re-process from the rasterization.

Since impositioning is included in Prepress process, unlike a case of using a film, correction in a film unit such as that in impositioning in Plate Making/Printing process is impossible.

(4) Moving and color matching in a page unit at the time of printing are impossible.

That is because digital data after rasterization in Prepress process is created not in a page unit but being impositioned.

(5) A stable supply of reprint within a certain period of time is impossible.

In relation to the above (3) and (4), it is impossible to reprint the printing plate in Plate Making/Printing process, and it takes more time than it needs to be.

(6) Dot gain adjustment on the printing plate is impossible.

Since dots are directly exposed on the printing plate in Plate Making/Printing process based on the rasterized digital data in Prepress process, dots cannot be corrected in Plate Making/Printing Process, and disadvantages due to dot gain (situation in which an area of dots of the printing plate does not match an area of ink of printed matter) cannot be prevented.

(7) Responsibility sharing of operations in Prepress process and Plate Making/Printing process cannot be clarified.

Since up to a process just before plate making is performed in Prepress process, Prepress process side also has to deal with problems occurred at Plate Making/Printing process side.

Furthermore, for efficiency of the printing plate, conventionally performed is that works that are convenient in a printing context are joined to be impositioned into one surface of the printing plate (this is called "joining"). However, such joining operation can be done with films, but not in CTP.

For example, there is a case in which as a printing plate where eight pages of a film are impositioned on one surface, desired to be made is a printing plate in which four pages are frontispieces of a magazine A and the remaining four pages are frontispieces of a magazine B. However, in CTP, impositioning is performed on Prepress process side, and thus it is impossible to make such an efficient printing plate in Plate Making/Printing process, disadvantageously causing problems in terms of efficiency of the-printing plate.

Similarly, when desired to be made is a printing plate in which eight pages of a film are impositioned on one surface in Plate Making/Printing process, conventionally the printing plate can be made once eight pages of the film are collected. However, in CTP, it is impossible to perform such processing even when two pieces of rasterized data for four pages have been sent. This is because (although page data included in the rasterized data at the time is in a state that four pages are impositioned on one surface) page imposition arrangement is different between when impositioning eight pages on one surface and when impositioning four pages on one surface.

On the other hand, offset/exposure adjustment described above is entirely performed by handwork on the film and workers are required to be skilled in techniques and be with experiences. However, even if the workers are skilled in techniques and with experiences, occurrence of adjustment difference cannot be avoided as long as the operation is performed by humans. Therefore, offset/exposure adjustment is sometimes repeated again and again until the final printing plate completes, disadvantageously taking lots of time.

Therefore, as to offset/exposure adjustment, it has been desired to improve printing accuracy and reduce operations in view of operation efficiency.

SUMMARY OF THE INVENTION

In order to solve the conventional disadvantages, an object of the present invention is to provide a digital impositioning apparatus capable of digital impositioning in Plate Making/Printing process using digital file output before or after being rasterized instead of film output without putting loads on Prepress process.

The present invention has the following features to achieve the object above.

A first aspect of the present invention is directed to a digital impositioning apparatus for performing impositioning in an electronic data form in Plate Making/Printing process using a rasterized file received from Prepress process, the rasterized file including:

one or more RIP files created by performing RIP operation without screening to page data created corresponding to each of at least one page; and arrangement information as to an arrangement position of all or part of the RIP files, the apparatus comprising:

impositioning means for creating raster data in which the RIP files which the rasterized file has are arranged on one surface under bookbinding rules by rewriting the arrangement information which the rasterized file has; and screening means for performing screening to the raster data created by the impositioning means.

As described above, in accordance with the first aspect, as a medium received by the impositioning apparatus, not a film in the conventional art but the rasterized file is used that is digital data composed of one or more RIP files and arrangement information. This can structure on Plate Making/Printing process a digital impositioning apparatus for performing impositioning to the RIP file corresponding to each page under bookbinding rules so as to finish one piece of printed matter with correct pagination when folded based on right-open or left-open.

According to a second aspect of the present invention, in the first aspect, the RIP file has at least dot density data corresponding to each pixel in the page, and the arrangement information has at least page origin data of an arrangement reference for each data item in the RIP file, the apparatus further comprising:

means for performing offset adjustment in a unit of the RIP file by determining arrangement of the page origin of the arrangement information relatively to a position of an origin of a reference of a finish frame; and means for performing exposure adjustment in the unit of the RIP file by changing density of each dot in the RIP file using a correction table.

As described above, in accordance with the second aspect, offset/exposure adjustment is further possible on digital data in Plate Making/Printing process, and workers can reliably and quickly perform fine adjustments by numerical value input or instructions without depending on skills and experiences. This allows labor savings in Plate Making/Printing process as well as improvement in printing accuracy.

According to a third aspect of the present invention, in the first aspect, the screening means can perform dot gain adjustment.

As described above, in accordance with the third aspect, in the first aspect, it is possible to perform dot gain adjustment to a printing plate, allowing improvement in quality of printed matter.

According to a fourth aspect of the present invention, in the first aspect, when the impositioning means creates the raster data, print additional information required for printing is arranged on the raster data.

As described above, in accordance with the fourth aspect, in the first aspect, it is possible to add the print additional information required for printing such as a register mark, a color patch, an offset rotary press mark, a serial number and the like on the raster data, allowing improvement in operability in Plate Making/Printing process.

According to a fifth aspect of the present invention, in the first aspect, when performing screening to the raster data, the screening means performs screening for proof subjected to color matching.

As described above, in accordance with the fifth aspect, in the first aspect, it is possible to perform color matching processing of matching color between the final printed matter and a proof for proof printing, allowing improvement in operability in Plate Making/Printing process.

According to a sixth aspect of the present invention, in the first aspect, when performing screening to the raster data, the screening means performs adjustment at the time of output to the RIP files for one page composing the raster data.

As described above, in accordance with the sixth aspect, in the first aspect, it is possible to correct the printing plate by color matching and movement of the RIP files for one page composing the raster data in a page unit, allowing a stable supply of a printing plate within a certain period of time.

According to a seventh aspect of the present invention, in the second aspect, the screening means can perform dot gain adjustment.

According to an eighth aspect of the present invention, in the second aspect, when the impositioning means creates the raster data, print additional information required for printing is arranged on the raster data.

According to a ninth aspect of the present invention, in the second aspect, when performing screening to the raster data, the screening means performs screening for proof subjected to color matching.

According to a tenth aspect of the present invention, in the second aspect, when performing screening to the raster data, the screening means performs adjustment at the time of output to the RIP files for one page composing the raster data.

As described above, the seventh to tenth aspects give the second aspect the same effects as the effects given by the third to sixth aspects to the first aspect.

An eleventh aspect of the present invention is directed to a digital impositioning apparatus for performing impositioning in an electronic data form in Plate Making/Printing process using a plurality of rasterized files received from Prepress process, the rasterized file including:

one or more RIP files created by performing RIP operation without screening to page data created corresponding to each of at least one page; and arrangement information as to an arrangement position of all or part of the RIP files, the apparatus comprising:

impositioning means for creating raster data in which the RIP files which the plurality of rasterized files have are arranged on one surface under bookbinding rules by rewriting the arrangement information which the plurality of rasterized files have; and screening means for performing screening to the raster data created by the impositioning means.

As described above, in accordance with the eleventh aspect, as a medium received by the impositioning apparatus, not a film in the conventional art but the plurality of rasterized files are used that are digital data composed of one or more RIP files and arrangement information. This can structure on Plate Making/Printing process a digital impositioning apparatus for performing impositioning to the RIP file corresponding to each page included in the plurality of rasterized files under bookbinding rules so as to finish one piece of printed matter with correct pagination when folded based on right-open or left-open. Thus, it is possible to flexibly cope with joining of printing plates, change of the number of pages to be impositioned at the time of plate making and the like.

According to a twelfth aspect of the present invention, in the eleventh aspect, the RIP file has at least dot density data corresponding to each pixel in the page, and the arrangement information has at least page origin data of an arrangement reference for each data item in the RIP file, the apparatus further comprising:

means for performing offset adjustment in a unit of the RIP file by determining arrangement of the page origin of the arrangement information relatively to a position of an origin of a reference of a finish frame; and means for performing exposure adjustment in the unit of the RIP file by changing density of each dot in the RIP file using a correction table.

As described above, in accordance with the twelfth aspect, offset/exposure adjustment is further possible on digital data in Plate Making/Printing process, and workers can reliably and quickly perform fine adjustments by numerical value input or instructions without depending on skills and experiences. This allows labor savings in Plate Making/Printing process as well as improvement in printing accuracy.

According to a thirteenth aspect of the present invention, in the eleventh aspect, the screening means can perform dot gain adjustment.

According to a fourteenth aspect of the present invention, in the eleventh aspect, when the impositioning means creates the raster data, print additional information required for printing is arranged on the raster data.

According to a fifteenth aspect of the present invention, in the eleventh aspect, when performing screening to the raster data, the screening means performs screening for proof subjected to color matching.

According to a sixteenth aspect of the present invention, in the eleventh aspect, when performing screening to the raster data, the screening means performs adjustment at the time of output to the RIP files for one page composing the raster data.

As described above, the thirteenth to sixteenth aspects give the eleventh aspect the same effects as the effects given by the third to sixth aspects to the first aspect.

According to a seventeenth aspect of the present invention, in the twelfth aspect, the screening means can perform dot gain adjustment.

According to an eighteenth aspect of the present invention, in the twelfth aspect, when the impositioning means creates the raster data, print additional information required for printing is arranged on the raster data.

According to a nineteenth aspect of the present invention, in the twelfth aspect, when performing screening to the raster data, the screening means performs screening for proof subjected to color matching.

According to a twentieth aspect of the present invention, in the twelfth aspect, when performing screening to the raster data, the screening means performs adjustment at the time of output to the RIP files for one page composing the raster data.

As described above, the seventeenth to twentieth aspects give the twelfth aspect the same effects as the effects given by the third to sixth aspects to the first aspect.

A twenty-first aspect of the present invention is directed to a digital impositioning apparatus for performing impositioning in a electronic data form in Plate Making/Printing process using a page description language file received from Prepress process, the page description language file including:

page description language data created with a page description language corresponding to each of at least one page, having at least dot density data corresponding to each pixel in the page; and arrangement information as to all or part of the page description language data, having at least page origin data of an arrangement reference for each data item in the page description language data, the apparatus comprising:

means for performing offset adjustment in a unit of the page description language data by determining arrangement of the page origin of the arrangement information relatively to a position of an origin of a reference of a finish frame; and means for performing exposure adjustment in the unit of the page description language data by changing density of each dot in the page description language data using a correction table.

As described above, in accordance with the twenty-first aspect, as a medium received by the impositioning apparatus, not a film in the conventional art but a page description language file is used that is digital data composed of page description language data and arrangement information. Therefore, offset/exposure adjustment is further possible on digital data in Plate Making/Printing process, and workers can reliably and quickly perform fine adjustments by numerical value input or instructions without depending on skills and experiences. This allows labor savings in Plate Making/Printing process as well as improvement in printing accuracy.

According to a twenty-second aspect of the present invention, in the twenty-first aspect, the page description language data further has vector data representing a component structured in the page description language data, and the means for performing exposure adjustment specifies an arbitrary component using the vector data when changing density of each dot in the page description language data using said correction table, thereby allowing exposure adjustment in a component unit in the page description language data.

As described above, in accordance with the twenty-second aspect, the page description language data further has vector data for each component structured in the page description language data. Thus, at the time of exposure adjustment, the above vector data is also specified at the time of density change by the correction table, thereby allowing exposure adjustment not only in a unit of the whole page description language data unit but also by a unit of component which exists therein.

A twenty-third aspect of the present invention is directed to a computer-readable recording medium recording a program to be executed in a computer apparatus, the program being for realizing on the computer apparatus an operating environment including:

for a rasterized file including a RIP file created by performing RIP operation without screening to page data created corresponding to each of at least one page and arrangement information as to an arrangement position of all or part of the RIP file, an impositioning step for creating raster data in which the RIP file which the rasterized file has is arranged on one surface under bookbinding rules by rewriting the arrangement information which the rasterized file has; and a screening step for performing screening to the raster data created by the impositioning step.

A twenty-fourth aspect of the present invention is directed to a computer-readable recording medium recording a program to be executed in a computer apparatus, the program being for realizing on the computer apparatus an operating environment including:

for a plurality of rasterized files including one or more RIP files created by performing RIP operation without screening to page data created corresponding to each of at least one page and arrangement information as to an arrangement position of all or part of the RIP files, an impositioning step for creating raster data in which the RIP files which the plurality of rasterized files have are arranged on one surface under bookbinding rules by rewriting the arrangement information which the plurality of rasterized files have; and a screening step for performing screening to the raster data created by the impositioning step.

According to a twenty-fifth aspect of the present invention, in the twenty-third aspect, the RIP file has at least dot density data corresponding to each pixel in the page, the arrangement information has at least page origin data of an arrangement reference for each data item in the RIP file, and the operating environment further includes the steps of:

performing offset adjustment in a unit of the RIP file by determining arrangement of the page origin of the arrangement information relatively to a position of an origin of a reference of a finish frame; and performing exposure adjustment in the unit of the RIP file by changing density of each dot in the RIP file using a correction table.

According to a twenty-sixth aspect of the present invention, in the twenty-fourth aspect, the RIP file has at least dot density data corresponding to each pixel in the page, the arrangement information has at least page origin data of an arrangement reference for each data item in the RIP file, and the operating environment further includes the steps of:

performing offset adjustment in a unit of the RIP file by determining arrangement of the page origin of the arrangement information relatively to a position of an origin of a reference of a finish frame; and performing exposure adjustment in the unit of the RIP file by changing density of each dot in the RIP file using a correction table.

A twenty-seventh aspect of the present invention is directed to a computer-readable recording medium recording a program to be executed in a computer apparatus, the program being for realizing on the computer apparatus an operating environment including the steps of:

for a page description language file including page description language data created with a page description language corresponding to each of at least one page, having at least dot density data corresponding to each pixel in the page; and arrangement information as to all or part of the page description data, having at least page origin data of an arrangement reference for each data item in the page description language data, performing offset adjustment in a unit of the page description language data by determining arrangement of the page origin of the arrangement information relatively to a position of an origin of a reference of a finish frame; and performing exposure adjustment in the unit of the page description language data by changing density of each dot in the page description language data using a correction table.

According to a twenty-eighth aspect of the present invention, in the twenty-seventh aspect, the page description language data further has vector data representing a component structured in the page description language data, and the step of performing exposure adjustment specifies an arbitrary component using the vector data when changing density of each dot in the page description language data using said correction table, thereby allowing exposure adjustment in a component unit in the page description language data.

As described above, the twenty-third to twenty-eighth aspects are directed to a computer-readable recording medium recording the program capable of executing the functions of the first, second, eleventh, twelfth, twenty-first and twenty-second aspects on a computer. Execution of the program can realize the same functions as those of the first, second, eleventh, twelfth, twenty-first and twenty-second aspects on a computer.

A twenty-ninth aspect of the present invention is directed to a digital impositioning apparatus for performing impositioning in an electronic data form in Plate Making/Printing process using a rasterized file or a page description language file received from Prepress process, the rasterized file including:

one or more RIP files created by performing RIP operation to page data created corresponding to each of at least one page, having at least dot density data corresponding to each pixel in the page; and arrangement information as to all or part of the RIP files, having at least page origin data of an arrangement reference for each data item in the RIP files, the page description language file including:

page description language data created with a page description language corresponding to each of at least one page, having at least dot density data corresponding to each pixel in the page; and arrangement information as to all or part of the page description data, having at least page origin data of an arrangement reference for each data item in the page description language data, the apparatus comprising:

selecting means for inputting both of the rasterized file and the page description language file, and selecting and then outputting either one of the both files;

means for performing offset adjustment in a unit of the RIP file or the page description language data by determining arrangement of the page origin of the arrangement information in the file selected in the selecting means relatively to a position of an origin of a reference of a finish frame; and means for performing exposure adjustment in the unit of the RIP file or the page description language data by changing density of each dot in the RIP file or the page description language data using a correction table.

According to a thirtieth aspect of the present invention, in the twenty-ninth aspect, the page description language data further has vector data representing a component structured in the page description language data, and when the selecting means selects the page description language file, the means for performing exposure adjustment specifies an arbitrary component using the vector data when changing density of each dot in the page description language data, thereby allowing exposure adjustment in a component unit in the page description language data.

As described above, in accordance with the twenty-ninth and thirtieth aspects, as a medium received by the impositioning apparatus, used is not a film in the conventional art but a rasterized file that is digital data composed of one or more RIP files and arrangement information or a page description language file that is digital data composed of page description language data and arrangement information. The digital impositioning apparatus further includes means capable of selecting the rasterized file or the page description language file. Thus, it is possible to suitably use either of the files according to a purpose of offset/exposure adjustment. Therefore, offset/exposure adjustment is further possible on digital data in Plate Making/Printing process, and workers can reliably and quickly perform fine adjustments by numerical value input or instructions without depending on skills and experiences. This allows labor savings in Plate Making/Printing process as well as improvement in printing accuracy.

These and other objects, features, aspects and advantages of the present invention will become more apparent from the following detailed description of the present invention when taken in conjunction with the accompanying drawings.

BRIEF DESCRIPTION OF THE DRAWINGS

FIG. 14 is a diagram showing an example of correction table;

DESCRIPTION OF THE PREFERRED EMBODIMENTS (First Embodiment)

Figure 1:
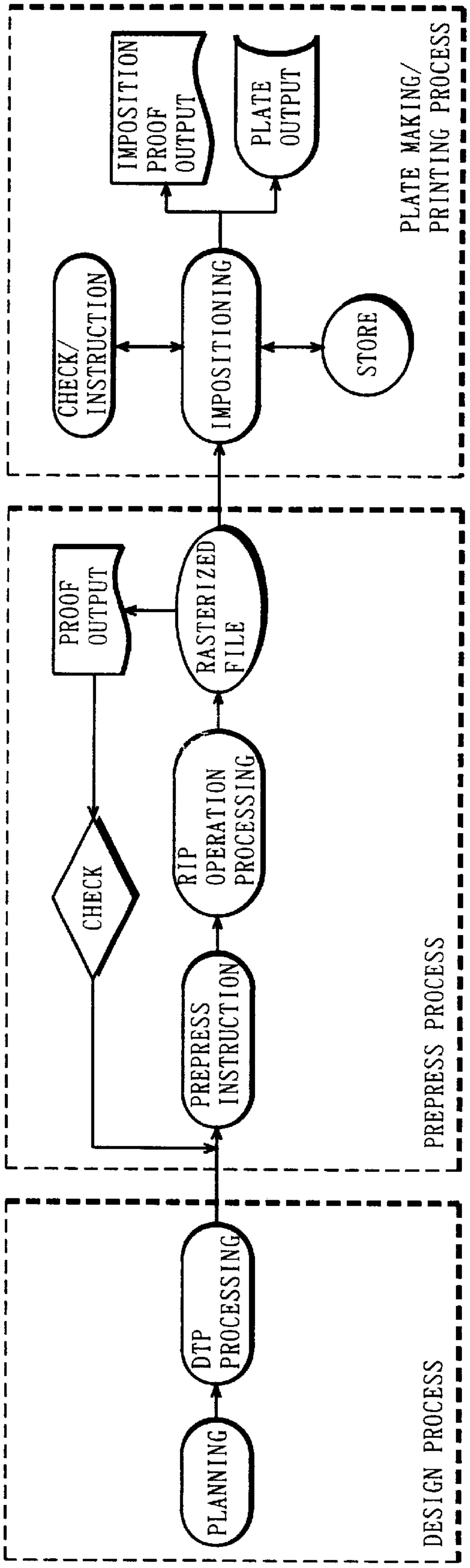
FIG. 1 is a block diagram showing the structure of a processing system using a digital impositioning apparatus according to first and second embodiments of the present invention.

FIG. 1 is a block diagram showing the structure of a processing system using a digital impositioning apparatus according to a first embodiment of the present invention. In FIG. 1, the processing system using the digital impositioning apparatus according to the first embodiment is composed of Design process, Prepress process, and Plate Making/Printing process.

In Design process, needs from a client who makes an order are formed into a plan. Then, processing is performed with DTP to make the plan into mechanical data. In Prepress process, after the mechanical data is received from Design process to arrange pictures, lines, and character strings, predetermined RIP operation processing for page data created under prepress instructions is performed, and a specific file which organizes files subjected to the RIP operation processing for one or two or more pages (hereinafter referred to as a rasterized file) is outputted. Here, the predetermined RIP operation processing is RIP without screening. The rasterized file is data which can substantially be a medium, and transmitted to Plate Making/Printing process. The rasterized file is also, in a sense, original data for proof output to the client. In Plate Making/Printing process, when the rasterized file is received, the impositioning is performed to output a printing plate and imposition proof. The contents of processing in impositioning can be checked step by step in a display device, and it is possible to specify processing. Furthermore, the rasterized file subjected to impositioning is stored as required. This impositioning part is performed in the digital impositioning apparatus according to the present invention described below.

Figure 2:
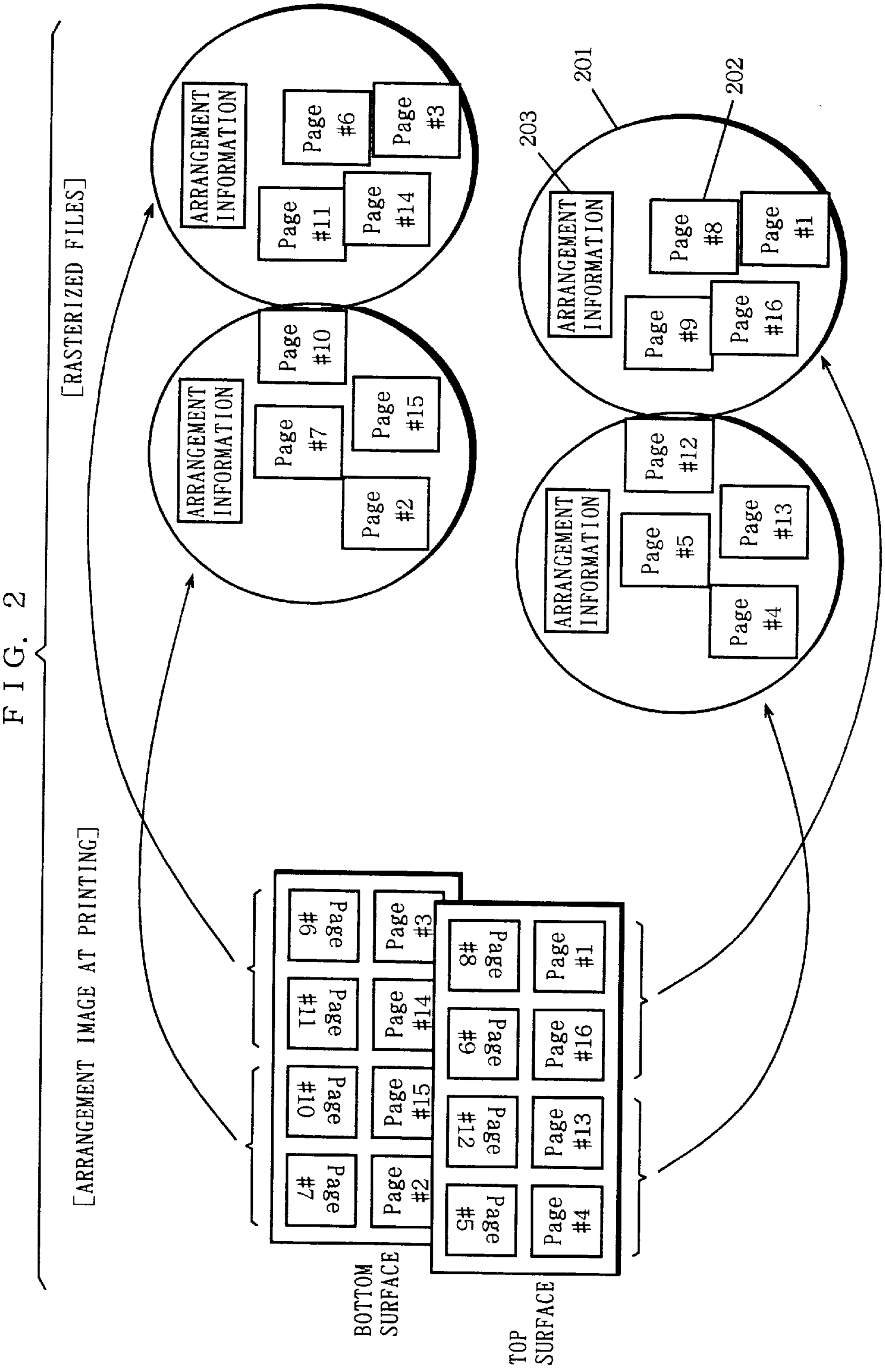
FIG. 2 is a diagram showing an example of data structure of rasterized files in FIG. 1.

First, before the digital impositioning apparatus according to the first embodiment of the present invention is described, the data structure of the rasterized file used for the digital impositioning apparatus is described. FIG. 2 shows an example of data structure of the rasterized file. FIG. 2 shows the rasterized files for 16-page-folded printed matter, showing that RIP files included in the rasterized files are laid out to become raster data for one surface.

In FIG. 2, a rasterized file 201 for use in the digital impositioning apparatus according to the first embodiment of the present invention is constructed of two types of data: one is data 202 subjected to the RIP (hereinafter referred to as a RIP file) and the other is arrangement information 203 about the data.

The RIP file 202 is a file of digital data outputted in a raster form obtained by operating page data for one page in which pictures, lines and character strings are arranged and to which prepress instructions are made. In the operation processing, the file is outputted in a raster form without screening (processing of converting tone into various dots, large and small) in order to allow dot gain adjustment in the following Plate Making/Printing process. As shown in FIG. 2, the RIP file 202 is created for each page, and at least one RIP file 202 is included in one rasterized file 201. Further, the number of RIP files 202 can be arbitrarily determined according to a device for use and a job function of a firm in charge of Prepress process and the like.

The arrangement information 203 is data about arrangement of the RIP file 202 included in the rasterized file 201 on a printing plate. FIG. 2 shows an example in which four pages, that is, four RIP files 202 are taken as one rasterized file 201, and in this case, the arrangement information 203 has data about arrangement of the RIP files 202 for four pages. The arrangement information 203 includes data about a page size, an offset between a page origin and a finish origin, a direction of the RIP file, RIP resolution and the like.

Figures 3A, 3B:
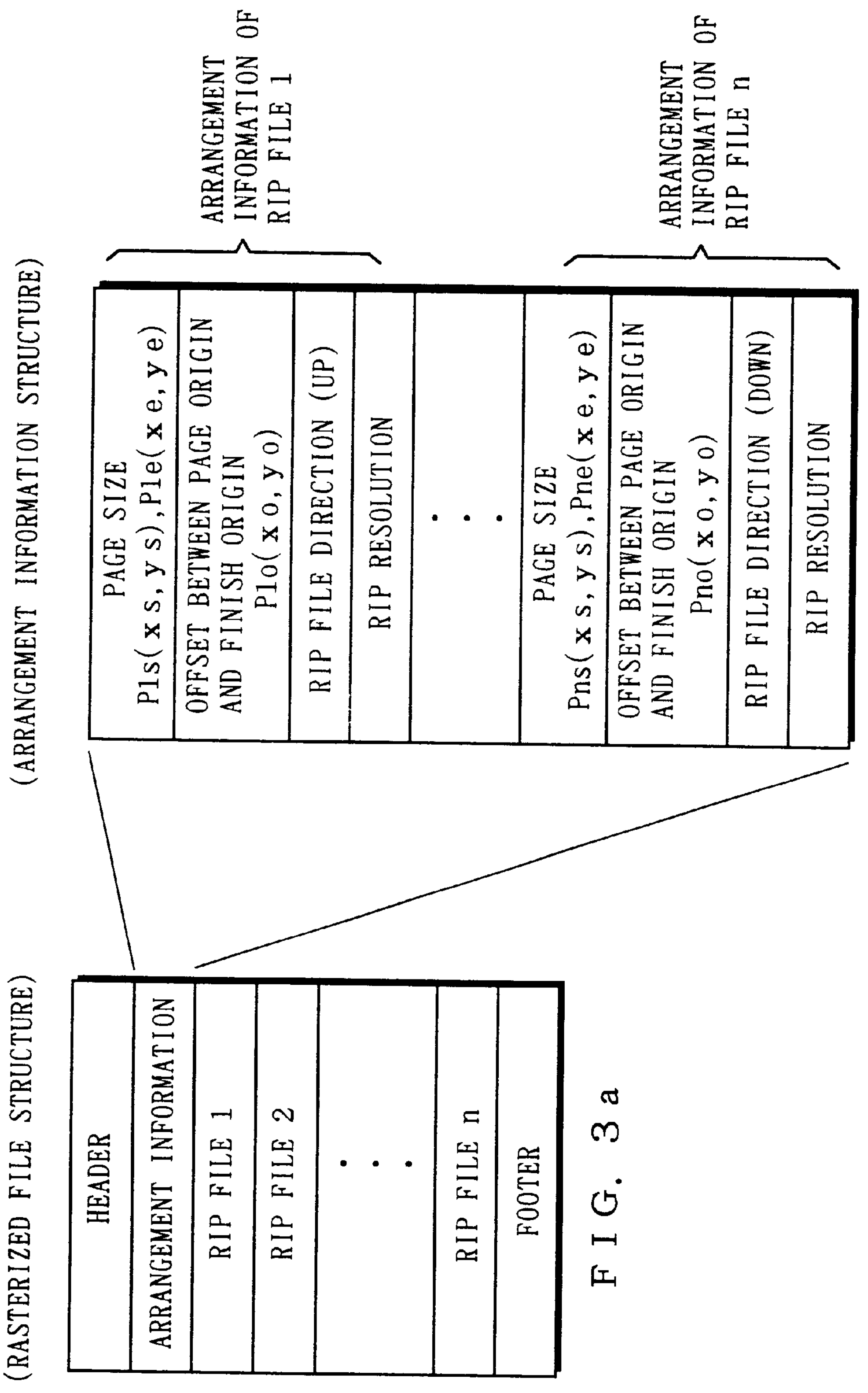
FIGS. 3*a* and 3*b* are diagrams showing an example of specific structure of a rasterized file 201.

An example of specific structure of the rasterized file 201 is shown in FIGS. 3*a* and 3*b*. FIG. 3*a* is a diagram showing the structure of the rasterized file 201, and FIG. 3*b* is a diagram showing the structure of the arrangement information 203 in the rasterized file 201.

In the present embodiment, although description is made assuming that the RIP file 202 and the arrangement information 203 are independent, the arrangement information 203 may be written in a header portion of each RIP file 202, for example.

Figure 4:
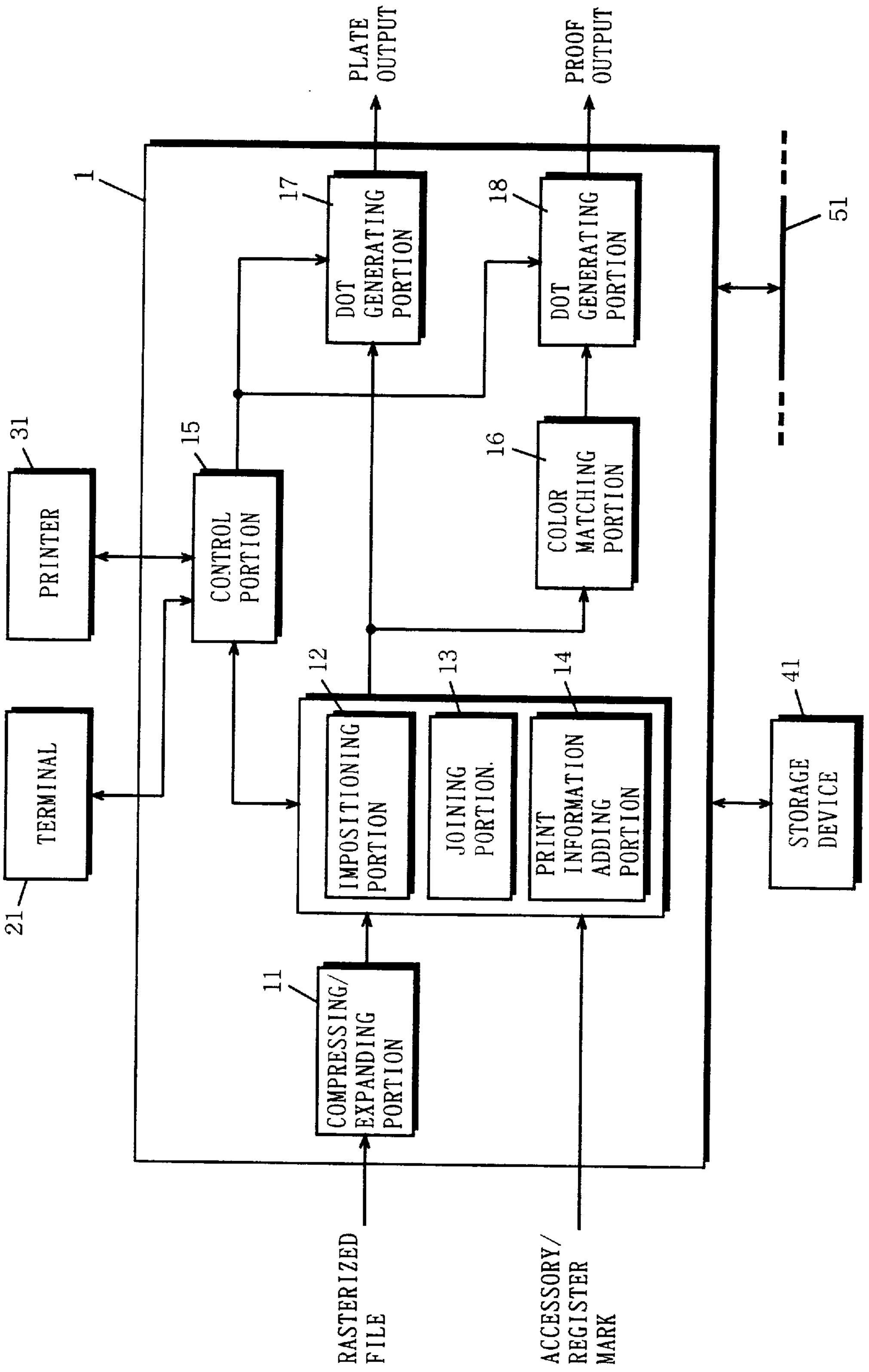
FIG. 4 is a block diagram showing an example of structure of the digital impositioning apparatus according to first to third embodiments of the present invention.

Referring to FIG. 4, described next is the digital impositioning apparatus for digitally performing impositioning using the above rasterized file 201 according to the present invention.

FIG. 4 is a block diagram showing the structure of the digital impositioning apparatus according to the first embodiment of the present invention. In FIG. 4, the digital processing apparatus 1 according to the first embodiment of the present invention includes a compressing/expanding portion 11, an impositioning portion 12, a joining portion 13, a print information adding portion 14, a control portion 15, a color matching portion 16, and dot generating portions 17 and 18.

The digital impositioning apparatus 1 is connected to a terminal 21 and makes the processing contents displayed on the terminal 21. Further, on receiving an instruction from the terminal 21, the digital impositioning apparatus 1 changes the processing as required. Further, the digital impositioning apparatus 1 is connected a printer 31 through the control portion 15. Thus, it is possible to know the information of the printer 31 at the terminal 21 or to input the information of the printer 31 from the terminal 21. Furthermore, the digital impositioning apparatus 1 is connected to an external storage device 41, and can also record and read a file or data as required. In addition, the digital impositioning apparatus 1 is connected to a network circuit 51, and can also record and read a file or data.

When the received rasterized file 201 is compressed, the compressing/expanding portion 11 expands the rasterized file 201 into a file of its original size. In some cases, compression is performed when the rasterized file 201 is so large in Prepress process, and the compressing/expanding portion 11 is to cope with these cases.

Based on the arrangement information 203 in the rasterized file 203, the impositioning portion 12 creates imposition data in which the RIP files 202 are arranged under bookbinding rules in which one sheet of printed matter is finished with correct pagination when folded based on right-open or left-open (hereinafter simply referred to as bookbinding rules). Here, the information about the printer 31 required for creating the imposition data has been transmitted through the control portion 15 to the terminal 21, as described above. Therefore, the impositioning portion 12 can always create appropriate imposition data by rewriting the arrangement information 203 as required by the instruction from the terminal 21.

The joining portion 13 connects the RIP files 202 which a plurality of rasterized files 201 have and then arranges the contents of the plurality of rasterized files 201 as raster data of one surface under the bookbinding rules on one printing plate. It is possible to perform positioning in the joining portion 13 as checking it on a screen of the terminal 21.

The print information adding portion 14 is to read, from outside, additional information required for different printing according to the types of the printer 31, and then adds the additional information to the above raster data of one surface so as to arrange the print additional information in required positions on the printing plate. The print additional information includes a color patch for use in measuring tone, an offset rotary press mark, a serial number of a register mark and a film and the like.

The dot generating portion 17 converts the raster data of one surface which has been subjected to the above various processing into data of dots. Here, the dot generating portion 17 can perform dot gain adjustment conforming to the printer 31 by the instruction from the control portion 15. As described above, the digital impositioning apparatus according to the present invention does not perform screening at the time of RIP in Prepress process, but generates dots in Plate Making/Printing process, thereby allowing dot gain adjustment. From the data of dots generated in the dot generating portion 17, a printing plate is finally made. Further, in order to obtain outputs for proof, the color matching portion 16 subjects the raster data of one surface which has been subjected to the above various processing to relative color matching, and after that, the dot generating portion 18 generates data of dots.

The control portion 15 performs, in addition to the overall control of the digital impositioning apparatus 1, communications with the printer 31 for output, management of the printing plate to be outputted, creation of ink control data and the like.

Figure 6:
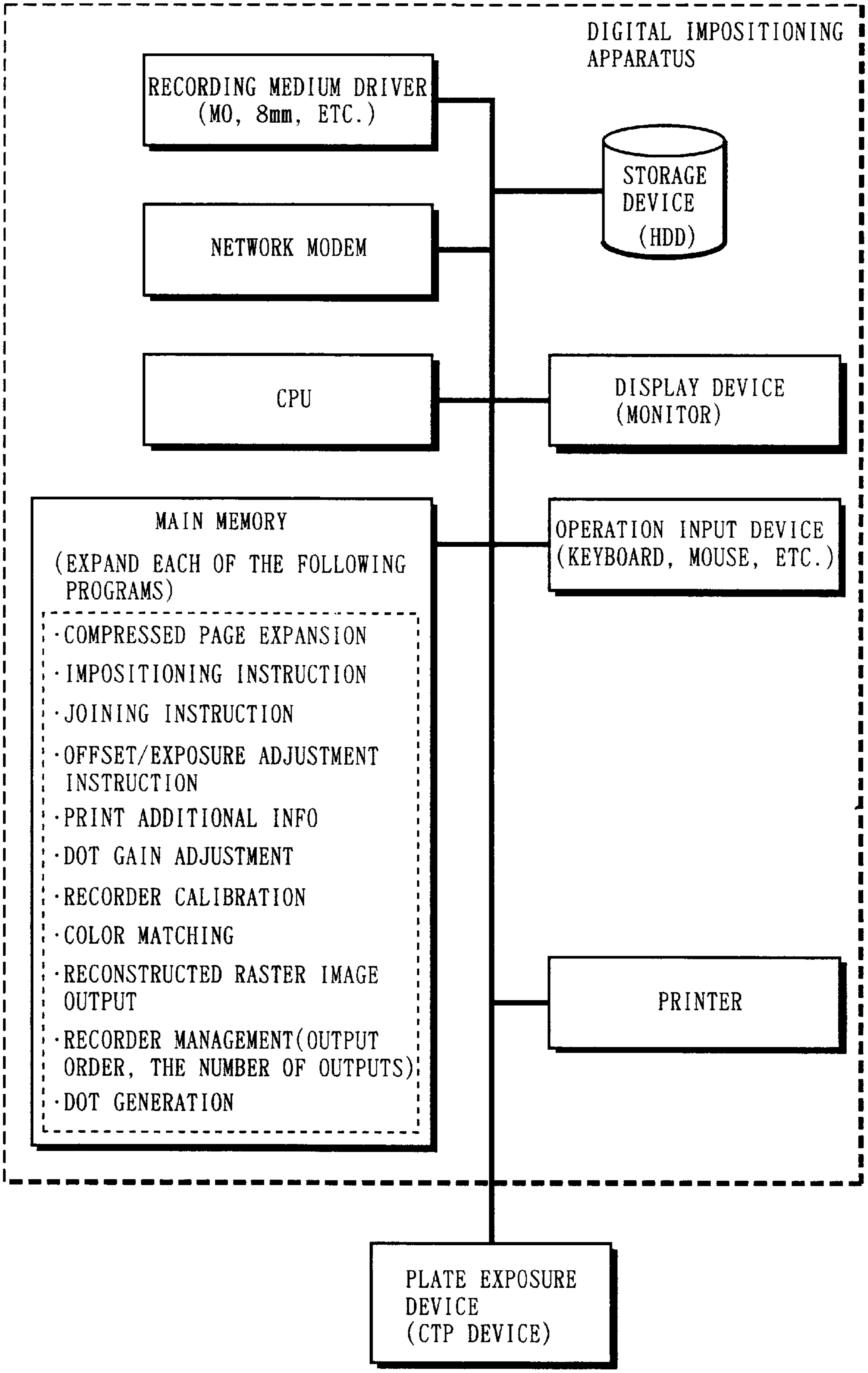
FIG. 6 is a block diagram showing the practical structure of a processing system using the digital impositioning apparatus according to the first to third embodiments of the present invention.

FIG. 6 is a diagram showing the specific structure of the digital impositioning apparatus according to the first embodiment of the present invention. The digital impositioning apparatus in FIG. 6 performs each process in the present invention with programs. The compressing/expanding portion 11, the impositioning portion 12, the joining portion 13, the print information adding portion 14, the color matching portion 16 and the dot generating portions 17 and 18 in the structure of FIG. 4 are processed by programs expanded on main memory. A network modem is connected to a network circuit (not shown), and can receive information of a printer (not shown) connected to the network circuit in the same manner. A CPU performs, as the control portion 15, the overall control of the digital impositioning apparatus shown in FIG. 6. An operation input device is an input device such as a keyboard, a mouse and the like, and an operator inputs instructions in the operation input device to specify operations in the impositioning portion 12, the joining portion 13, and the print information adding portion 14. Further, the operation input device can also input information about a printer to make an instruction to the printer. The instruction includes, for example, the size of a usable printing plate, a position of a print effective area on the printing plate, a size of a paper for use, a positional relation between the paper and the plate, and the like. The contents of the operation is displayed on a display device (monitor). A printer performs proof output. A storage device functions as the external storage device 41 in FIG. 4. Further, a storage medium driver retains data on the storage device offline and is used for reading from a recording medium which records program for making the apparatus function as the digital impositioning apparatus.

The programs which realizes these functions are provided in a form being recorded in a recording medium readable by a computer machine. Typical examples of the recording medium readable by a computer are a CD-ROM, a MOD, a flexible disk, a transportable hard disk, a ROM cassette, a punch card, bar code, a memory card and the like.

Alternatively, the programs which realize these functions may be supplied through a communication route to the computer machine.

Figure 5:
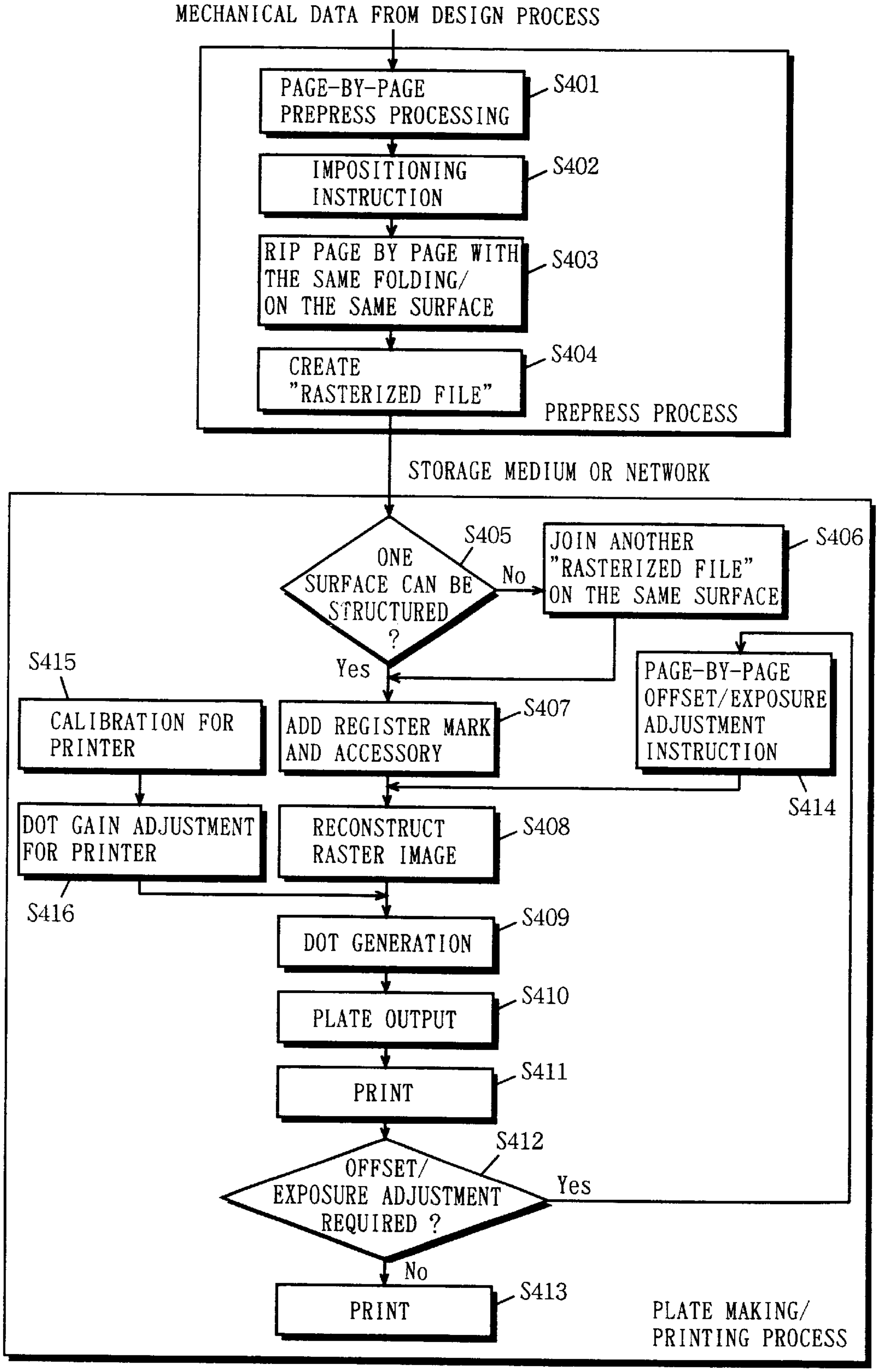
FIG. 5 is a diagram showing an example of flow of processing in Prepress process and in Plate Making/Printing process including the digital impositioning apparatus 1 in the first embodiment of the present invention.

Described below is a flow of processing in the above structured digital impositioning apparatus 1. FIG. 5 is a diagram showing an example of flow of processing in Prepress process and in Plate Making/Printing process including the digital impositioning apparatus 1.

Referring to FIG. 5, in Prepress process, digital mechanical data subjected to DTP processing and outputted from Design process is received, pictures, lines, and character strings are arranged, and then processing required for prepress is performed for each page (step S401). Next, after the processing required for prepress is finished, an impositioning instruction is made so that pages are arranged under the bookbinding rules, and then divided into arbitrary groups (groups with the same folding or on the same surface) (step S402). Based on the grouping, RIP is performed (step S403), and the rasterized file 201 is created composed of the RIP file 202 for each page in the group and the arrangement information 203 for each group (step S404). As described above, the RIP file 202 for each page is page data before dot processing. After the above processing in Prepress process is finished, the rasterized file 201 is transmitted to Plate Making/Printing processing through a storage medium such as a recording medium and the like or network communications. At this time, if required, compressing of the rasterized file 201 is performed.

After receiving the rasterized file 201 from Prepress process, Plate Making/Printing process determines whether or not an imposition unit of the rasterized files 201 (a unit which the impositioning instruction specifies in step S402) matches an output unit used for one surface of the printer for printing (step S405). When the transmitted rasterized file 201 is compressed, it goes without saying that expanding processing must be performed before the determination in step S405. As described above, the control portion 15 connected to the printer 31 makes this determination. Here, when the imposition unit matches the output unit for one surface of the printer 31, the processing goes on to the following processing, as it is. However, for example, when four pages are impositioned on one surface in the rasterized file 201 while the printer 31 prints with imposition of eight pages for one surface, the rasterized file 201 and another different rasterized file 201 are jointed on the same surface so as to imposition eight pages on one surface to make raster data of one surface (step S406).

Figure 7A:
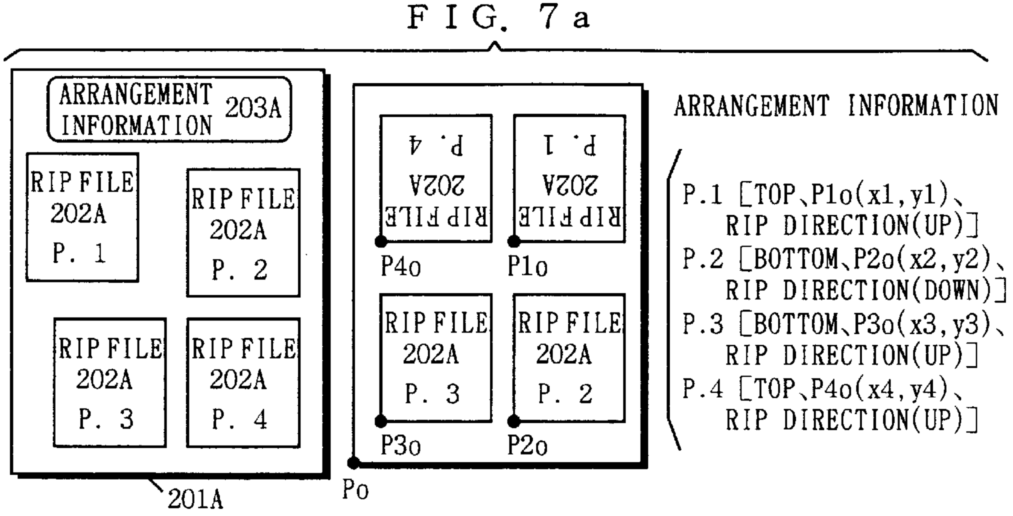
FIGS. 7*a* to 7*c* are diagrams showing a process in which, from rasterized files 201A and 201B related to each other in each of which four pages are impositioned on one surface, imposition data 204A in which eight pages are impositioned on one surface is created by impositioning.
Figure 7B:
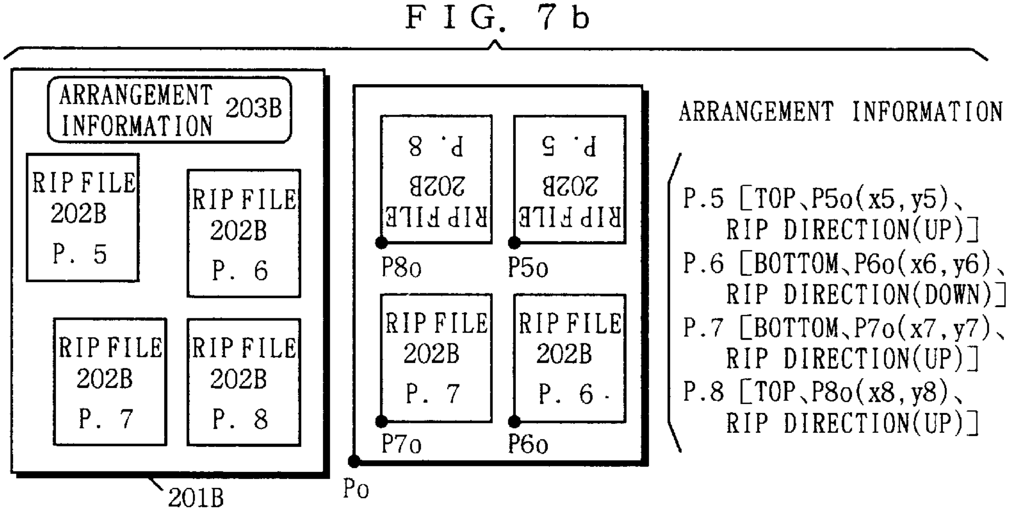
Figure 7C:
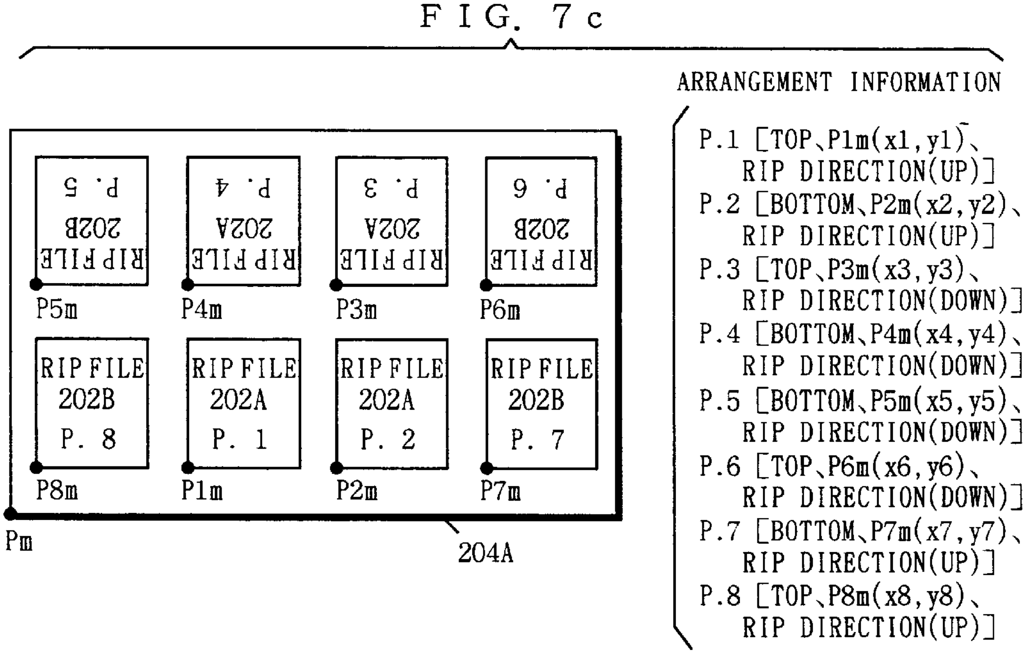

Step S406 is now described in detail referring to FIGS. 7*a* to 7*c*. FIGS. 7*a* to 7*c* show a process that rasterized files 201A and 201B in which four pages are impositioned on one surface are joined to create raster data 204A (one-side surface only) of one surface in which eight pages are impositioned on one surface.

First, the digital impositioning apparatus 1 arranges four RIP files 202A based on arrangement information 203A which the rasterized file 201A has (FIG. 7*a*). Next, the digital impositioning apparatus 1 arranges four RIP files 202B based on arrangement information 203B which the rasterized file 201B has (FIG. 7*b*).

Thereafter, the joining portion 13 recognizes, based on names or extensions of the rasterized files 201A and 201B, or information stored in headers, that the rasterized files 201A and 201B have a series of page data. The joining portion 13 then rewrites an offset between a page origin and a finish origin stored in the arrangement information 203A and 203B to make raster data of one surface in which eight pages are impositioned on one surface under the bookbinding rules.

As a result, the two rasterized files 201A and 201B are constructed as raster data 204A of one surface in which eight pages are impositioned on one surface (FIG. 7*c*).

This step S406 allows the digital impositioning apparatus 1 to unify a plurality of rasterized files 201 into the raster data 204A of one surface.

Further, in Plate Making process, a work called "joining" exists where mechanicals for different works are mixed on one printing plate to make one surface by collecting works that cannot put into one plate surface and works that are convenient in a printing context, thereby seeking an effective use of the printing plate.

The digital impositioning apparatus 1 can also cope with this type of work in step S406.

Figure 8A:
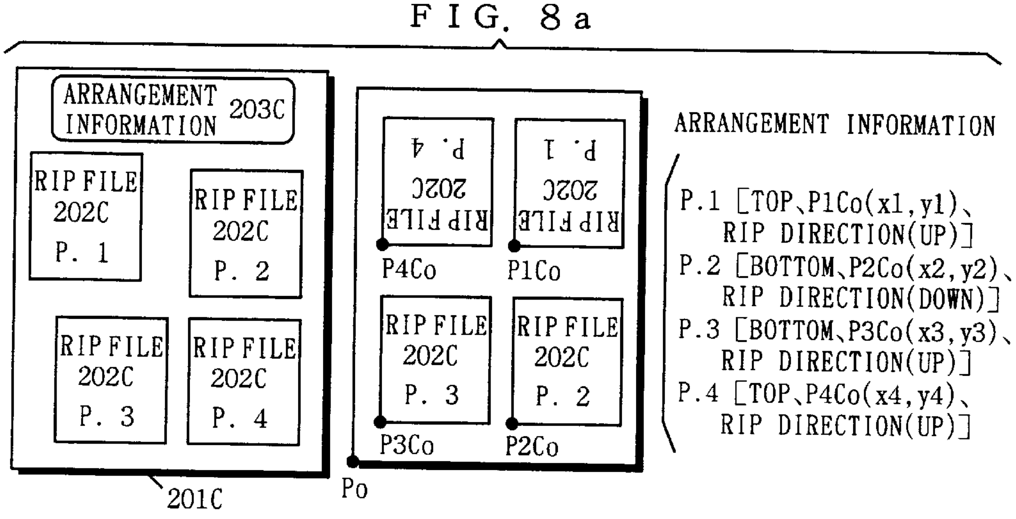
FIGS. 8*a* to 8*c* are diagrams showing a process in which, from rasterized files 201C and 201D not related to each other in each of which four pages are impositioned on one surface, imposition data 204C in which eight pages are impositioned on one surface is created by impositioning.
Figure 8B:
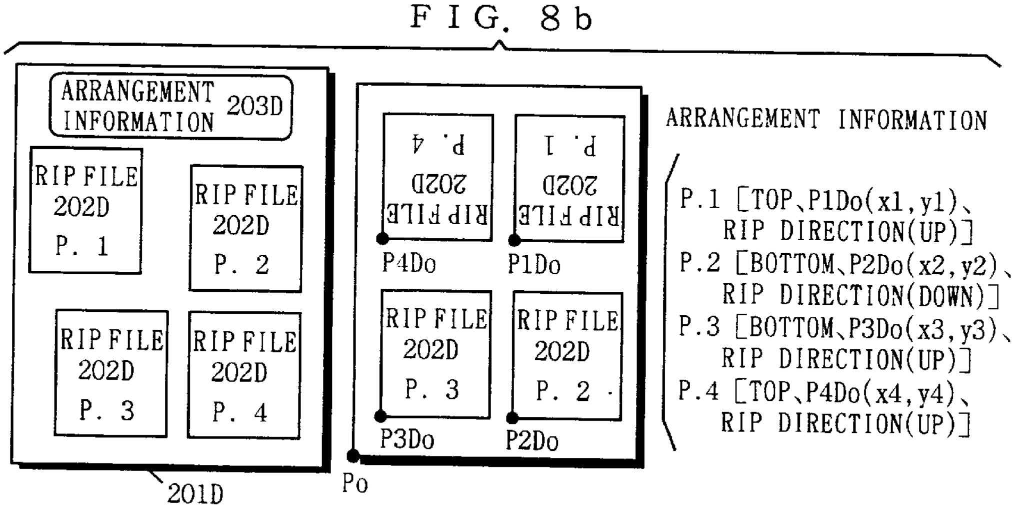
Figure 8C:
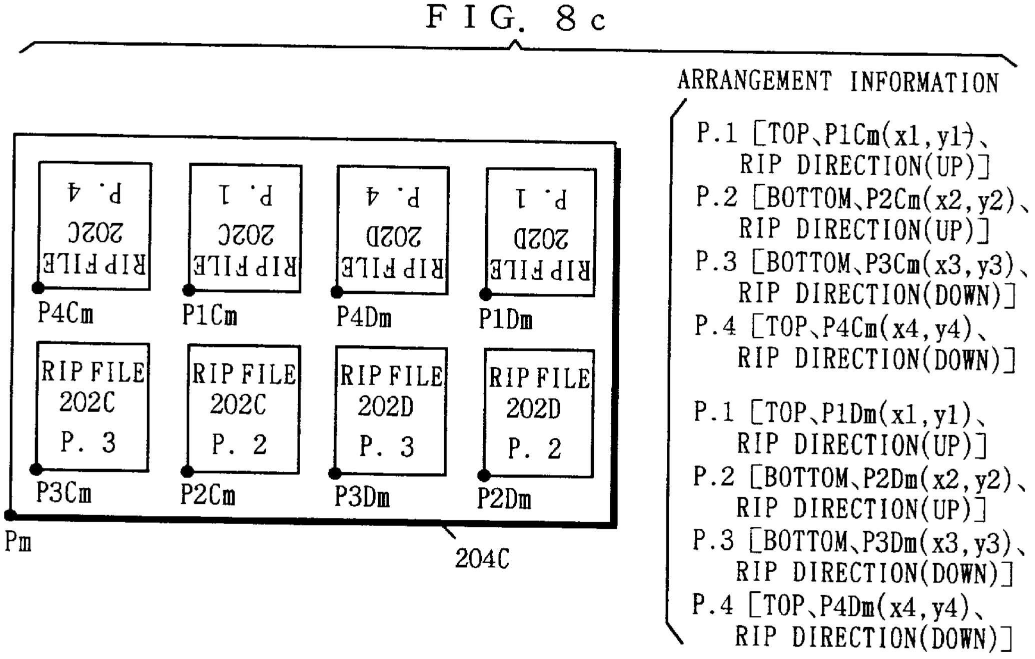

FIGS. 8*a* to 8*c* show a process that a rasterized file 201C where four pages are impositioned on one surface and a rasterized file 201D where four pages are also impositioned on one surface but which has a plurality of RIP files 202D with totally different contents from that of the rasterized file 201C are joined to make raster data 204C of one surface where eight pages are impositioned on one surface.

In the same way, the digital impositioning apparatus 1 arranges four RIP files 202C based on arrangement information 203C which the rasterized file 201C has (FIG. 8*a*). Next, the digital impositioning apparatus 1 arranges four RIP files 202D based on arrangement information 203D which the rasterized file 201D has (FIG. 8*b*).

Thereafter, the joining portion 13 recognizes, based on names or extensions of the rasterized files 201C and 201D, or information stored in headers, that the rasterized files 201C and 201D have page data having different works. The joining portion 13 then makes raster data 204C of one surface in which eight pages are impositioned on one surface but the four pages of the RIP files 202C and the four pages of the RIP files 202D are independently impositioned under the bookbinding rules (FIG. 8*c*).

Next, in Plate Making/Printing process, the print additional information required for printing is added to the raster data of one surface (step S407). After the above processing, the digital impositioning apparatus 1 reconstructs the above raster image of one surface, not for each page (step S408).

After step S405 or step S406, in Plate Making/Printing process, dots are generated from the raster image reconstructed in step S408 (step S409). At the time of generating dot data, it is possible to make calibration of the printer for printing (step S415). Furthermore, it is also possible to make dot gain adjustment suitable for the printer (step S416). A printing plate is made based on the dot data generated by adding this dot gain adjustment (step S410). Printing is then performed using the printing plate (step S411).

Finally, in Plate Making/Printing process, print condition of the printed matter is checked (step S412). As a result of check, if there is no problem, printing continues (step S413), while if there is a problem, the RIP file 202 is subjected to offset/exposure adjustment (step S414) and then the raster image is reconstructed in order to re-make a printing plate (step S408).

As described above, the digital impositioning apparatus according to the first embodiment of the present invention digitally realizes impositioning which is conventionally in an analog fashion using films, by using the rasterized file 201 composed of the plurality of RIP files 202 and arrangement information 203 of these files.

Therefore, the digital impositioning apparatus according to the first embodiment of the present invention can simultaneously realize cut of delivery time, reduction in prepress cost and the like due to cut of processing process and reduction in works in Prepress process, which are advantages in CTP; securing editing in Plate Making/Printing process having the same quality as in a conventional apparatus; and clarification of share responsibilities between in Prepress process and in Plate Making/Printing process.

(Second Embodiment)

Described in detail in a second embodiment of the present invention is offset/exposure adjustment in impositioning performed by the digital impositioning apparatus according to the first embodiment.

Therefore, in the second embodiment of the present invention, the structure of the processing system used for the digital impositioning apparatus (refer to FIG. 1), the data structure of the rasterized file used for the digital impositioning apparatus (refer to FIG. 2), the structure of the digital impositioning apparatus (refer to FIG. 4) and the practical structure of the processing system (refer to FIG. 6) are the same as those described in the above first embodiment.

Therefore, description below in sequence concentrates on parts in which the digital impositioning apparatus according to the second embodiment is different from the digital impositioning apparatus according to the first embodiment.

Figure 9:
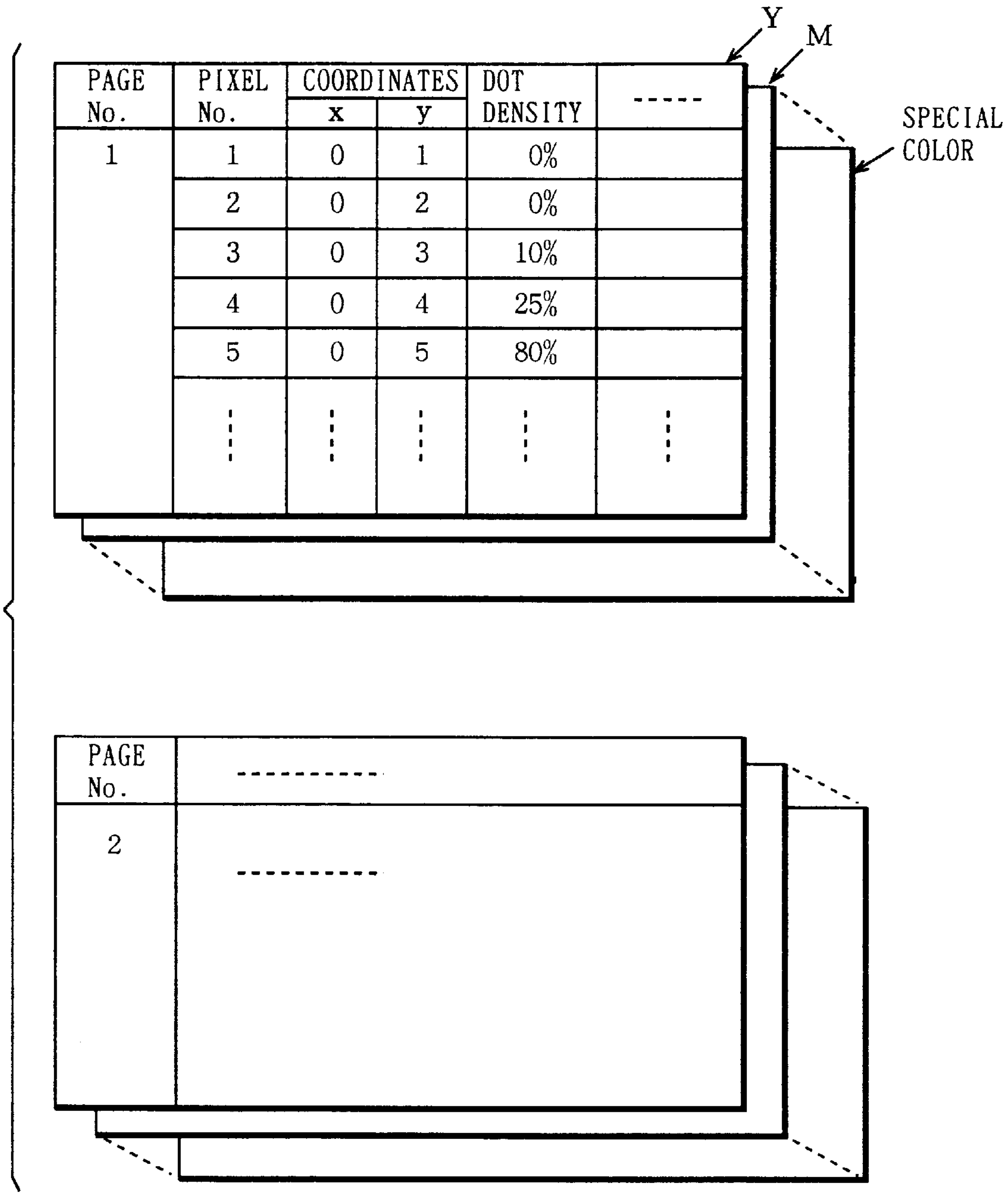
FIG. 9 is a diagram showing an example of data structure of a RIP file 202.

First, an example of data list constructed in the RIP file 202 in the rasterized file 201 is shown in FIG. 9. In FIG. 9, first written in the data list is a page number of the RIP file 202. Then, written is data such as numbers, coordinate values (values related to origin coordinates of the arrangement information 203), dot density (exposure density at the time of dot generation) and the like which correspond to each pixel. Practically, a data list is constructed with respect to one page number for each separation, that is, an Y Th (yellow) separation, an M (magenta) separation, a C (cyan) separation, a K (black) separation and a special color (color other than Y, M, C, and K) separation as required.

Figure 10:
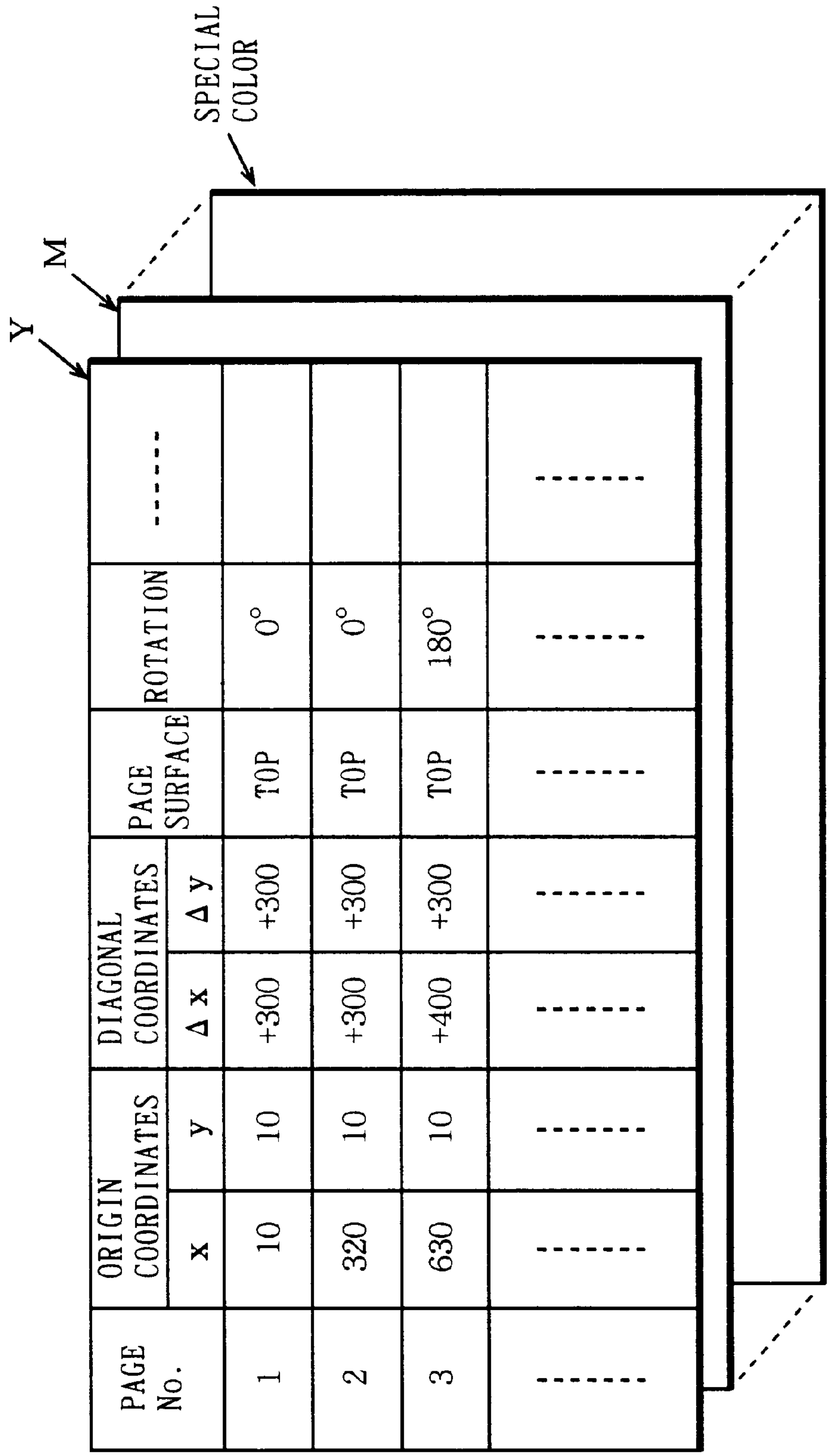
FIG. 10 is a diagram showing an example of data structure of arrangement information 203.

Further, an example of data list constructed in the arrangement information 203 in the rasterized file 201 is shown in FIG. 10. FIG. 10 represents the arrangement information 203 described in FIG. 3 in a data list form. In FIG. 10, first written in the data list are page numbers. The page numbers in the arrangement information 203 correspond to the page numbers in the RIP file 202. Then, coordinate values of the origin of the RIP file 202 represented by the page number and data areas of the RIP file 202 are written as diagonal coordinate values (in FIG. 10, represented as the amount of change from the origin coordinates). Furthermore, written is data such as a page surface delineating the page surface faces to top or bottom, rotation delineating the direction of the page and the like. Also in the arrangement information 203, a data list is constructed for each separation (Y, M, C, K and special color).

Described next is the digital impositioning apparatus according to the second embodiment for digitally performing offset/exposure adjustment using the above rasterized file 201.

The operator specifies processing as to impositioning such as offset/exposure adjustment and the like performed in the digital impositioning apparatus 1 from the terminal 21 and checks the processing on the display screen of the terminal 21. The impositioning portion 12 performs impositioning/joining and offset/exposure adjustment for each page based on the rasterized file 201 to create imposition data.

Figure 11:
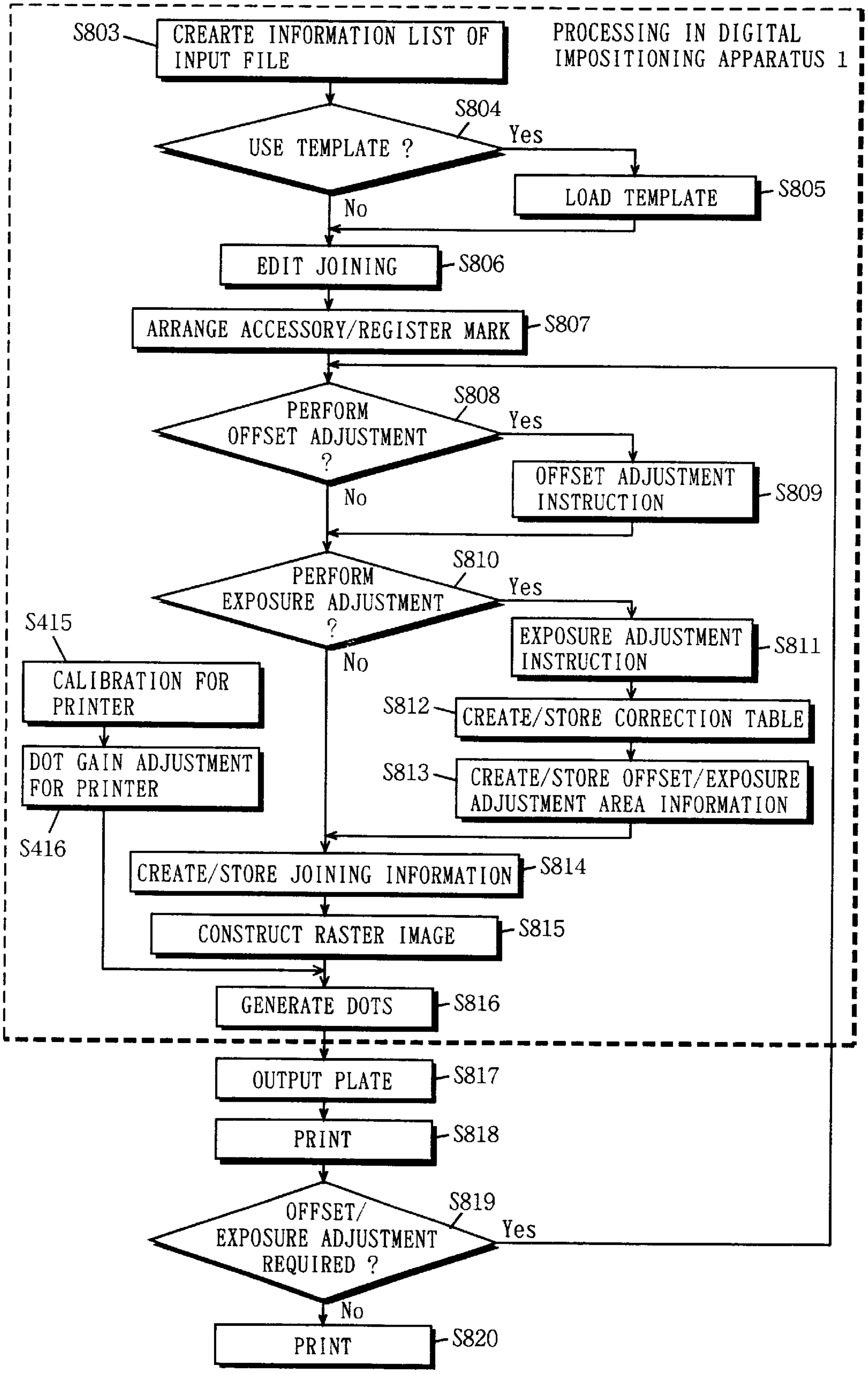
FIG. 11 is a diagram showing an example of flow of processing in Plate Making/Printing process including the digital impositioning apparatus 1 according to the second and third embodiment of the present invention.

Described now is processing performed in the digital impositioning apparatus 1 including offset/exposure adjustment performed in the above impositioning portion 12, using FIG. 9 to FIG. 11. FIG. 11 is a diagram showing an example of flow in Plate Making/Printing process in which the digital impositioning apparatus 1 positions. Steps S803 to S806 in FIG. 11 relate to steps S405 and S406 in FIG. 5. Further, steps S808 to S814 relate to step S414 in FIG. 5.

Referring to FIG. 11, in Plate Making/Printing process, an information list is created based on each data item in the rasterized file 201 received through a storage medium such as a recording medium and the like or network communications from Prepress process (step S803). The information list is to display each setting condition on the display screen of the terminal 21 operated by the operator as pictures, and is created by extracting necessary data from the rasterized file 201. When the rasterized file 201 is compressed, it goes without saying that expanding must be performed before determination of step S803.

Next, joining, impositioning and page impositioning (hereinafter referred to joining and the like) are performed. Here, it is determined whether to use a template (data restoring various setting values at the time of previous impositioning as examples of setting values) (step S804). When an existing template is used, the template is read from a recording device which stores the template and used for setting values (step S805). Further, it is possible to subject the template to joining edits. When not used, new setting values are each calculated to perform edits such as joining and the like (step S806). Next, the print additional information required for printing (accessories and register marks) are arranged (step S807).

After joining and the like and print additional information processing are finished, it is next determined whether to perform offset adjustment (step S808). Here, when offset adjustment is performed, the operator makes an instruction as to offset adjustment from the terminal 21 (step S809). Then, after the instruction in step S809 or when no offset adjustment is performed, it is next determined whether to perform exposure adjustment (step S810). When exposure adjustment is performed, the operator makes an instruction as to exposure adjustment from the terminal 21 (step S811).

Here, described in detail are the above offset/exposure adjustment and instructions thereof referring to FIGS. 12*a* and 12*b* and FIGS. 13*a* and 13*b*.

Figure 12A:
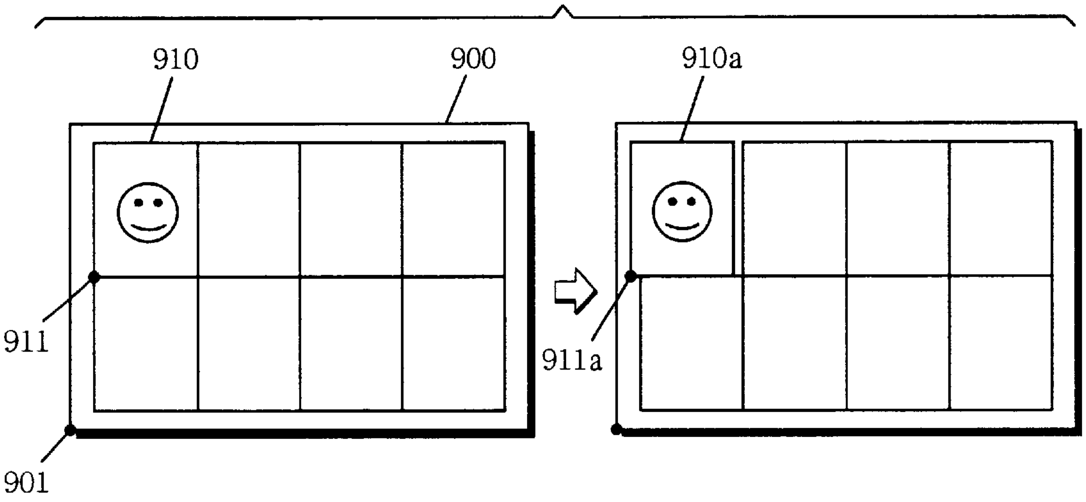
FIGS. 12*a* and 12*b* are diagrams showing an example of offset adjustment and exposure adjustment in the digital impositioning apparatus according to the second embodiment of the present invention.

First, as shown in FIG. 12*a*, offset adjustment is to adjust a position of page data 910 (corresponding to the RIP file 202) on a printing paper 900 at the time of finish. This adjustment is performed by changing relative values between origin coordinates 901 of a finish frame (in FIG. 12*a*, a lowerleft corner of the printing paper 900) and origin coordinates 911 of the page data 910 to be subjected to offset adjustment. The operator only makes an instruction as to the origin coordinates 911 when performing offset adjustment. Specifically, the values of the origin coordinates (x, y) in the arrangement information 203 shown in FIG. 10 are rewritten. This, as shown in FIG. 12*a*, moves the position of the entire page data 910 to a position of page data 910*a*.

Figure 12B:
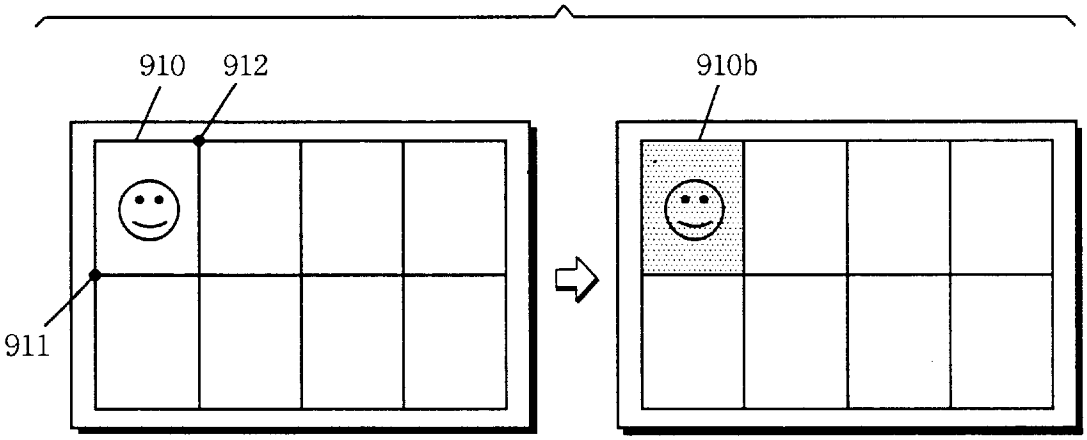

Next, exposure adjustment is to adjust tone of pixels of page data. In the rasterized file 201, as shown in FIG. 12*b*, density adjustment is possible only in a page data unit. This is because the RIP file 202 is constructed as a rasterized serial data for each page. In FIG. 12*b*, an exposure adjustment area is specified by specifying coordinates of two points, the origin coordinates 911 of the page data 910 and diagonal coordinates 912 of the page data 910, and giving a rectangle area defined by the two points. Therefore, when performing exposure adjustment, the operator only specifies the origin coordinates 911 and the diagonal coordinates 912. Particularly, as shown in FIG. 10, since the origin coordinates 911 and the diagonal coordinates 912 are stored as a pair in the arrangement information 203, it follows that the operator specifies an applicable page number. Density adjustment in a page unit is thus possible (page data 910*b* in FIG. 12*b*).

When the area to be subjected to exposure adjustment is specified by the above method, exposure density in the area is corrected. As a method for correcting exposure density, there are mainly two methods shown below.

Figure 13A:
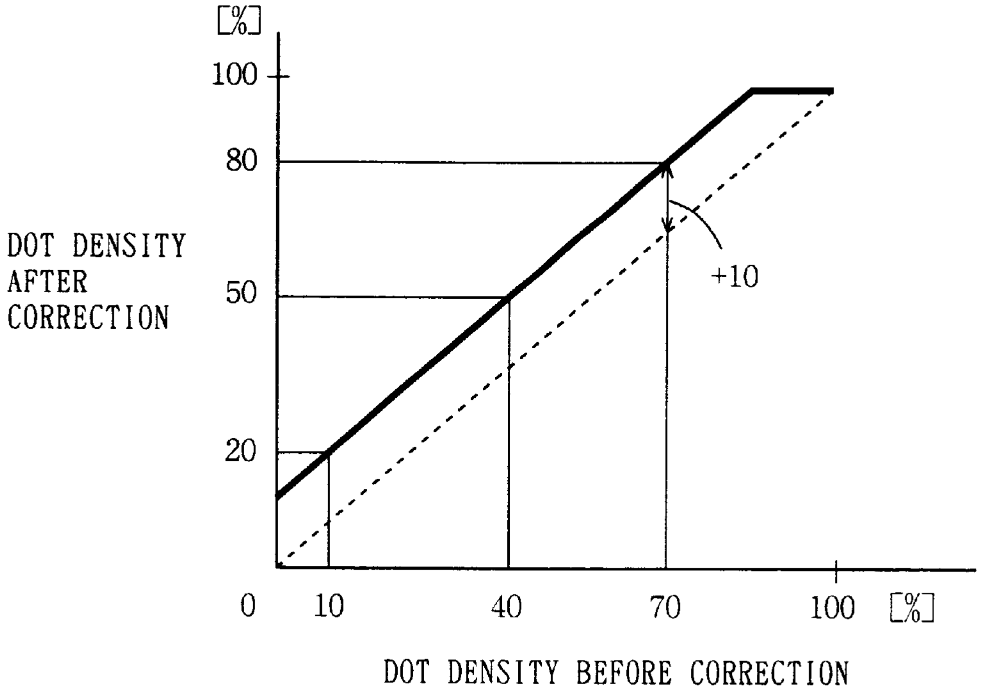
FIGS. 13*a* and 13*b* are diagrams showing an example of linear line and tone curve for use in calculating a correction value of exposure adjustment.
Figure 13B:
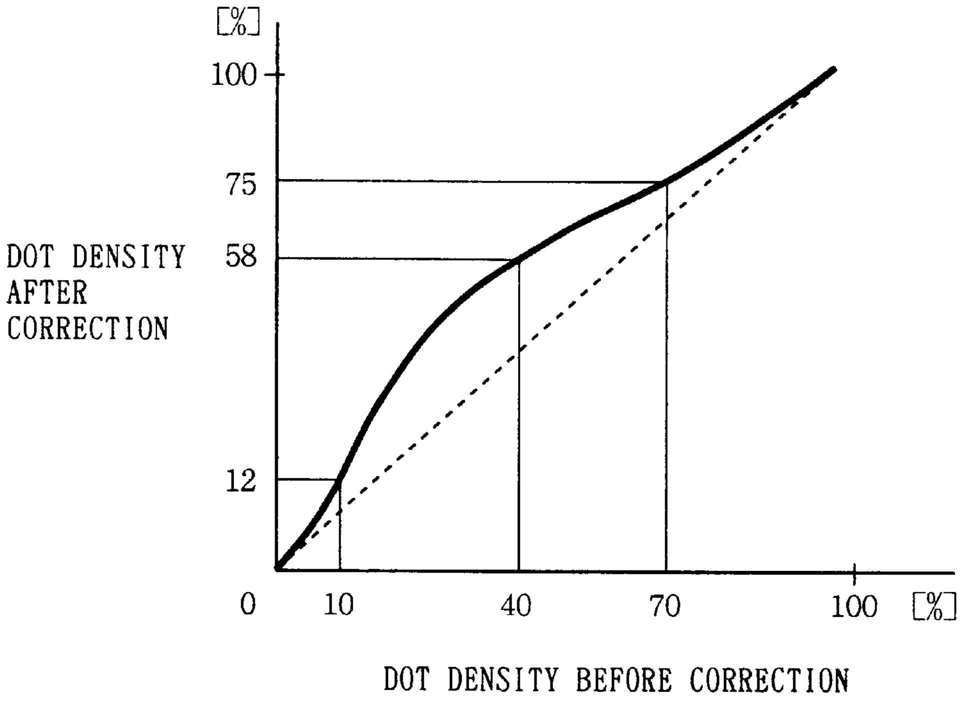

One is an adjustment method in which the amount of change in density to be adjusted is inputted as a numerical value. In this adjustment method, how much density is added to (or subtracted from) a currently set density is inputted to change a preset value. Therefore, the operator only inputs a numerical value of a difference for correction from the terminal 21. For example, when a numerical value of +10[%] is inputted, as shown in FIG. 13*a*, the entire density is uniformly, linearly corrected in accordance with a bold line set by input such that a present density of 10% is corrected to a density of 20%, a present density of 40% is corrected to a density of 50%, and a present density of 70% is corrected to a density of 80%.

The other is an method of adjusting density using a tone curve. The tone curve is a previously set curve for correcting exposure density as shown in a bold line in FIG. 13*b*. A plurality of tone curves previously exist (stored in the storage device 41), and a tone curve required for a use purpose is selected to change the preset value. Therefore, the operator only selects an applicable tone curve from the terminal 21. When a plurality of density areas which are different from each other exist in one page, use of the tone curve individually corrects each present density area according to the density defined by the tone curve. For example, in FIG. 13*b*, a present density of 10% is corrected to a density of 12%, a present density of 40% is corrected to a density of 58%, and a present density of 70% is corrected to a density of 75%.

Referring to FIG. 11 again, when exposure adjustment instruction is made in step S811, a correction table as shown in FIG. 14 is created (step S812). For the instruction by numerical value input as described above, this correction table is a table composed of values obtained by adding the numerical value to each density (when a density after the numerical value are added exceeds 100%, it goes without saying that the density is limited to a density of 100%). On the other hand, when using the above tone curve, created is a table composed of each density calculated from the tone curve (not shown). This correction table is referred at the time of dot generation in the following step and used for density changes. Specifically, in FIG. 13*a*, when dots of pixels with a present density of 10% are generated, a "dot density after correction" 20% is obtained referring to a 10% section of "present dot density" in the correction table, and dots are generated based thereon.

Specifying by numerical value input and by a tone curve as described above is possible for each separation of Y, M, C, K, and special color of the above RIP file 202, and in this case, the correction table is also created for each separation.

After correction table creation described above, offset/exposure adjustment area information is created showing an area to be subjected to exposure adjustment whose instruction is made in step S811 (step S813). This offset/exposure adjustment area information shows for which page or area the exposure adjustment instruction is made. Like the correction table described above, the offset/exposure adjustment area information is used at the time of dot generation in the following step for density changes. Furthermore, the offset/exposure adjustment area information is stored in the storage device 41 to be utilized for future printing and the like.

After the offset/exposure adjustment area information is created or when exposure adjustment is not performed, joining information required for constructing the final raster images is created (step S814). The joining information includes the instruction of joining edit and offset adjustment in steps S806 and S809 above. Further, the joining information is stored in the storage device 41 to be utilized for future printing and the like. After creating the joining information, the digital impositioning apparatus 1 constructs raster image data not in a page unit but as one surface of a printing paper referring to the joining information (step S815).

Figure 15:
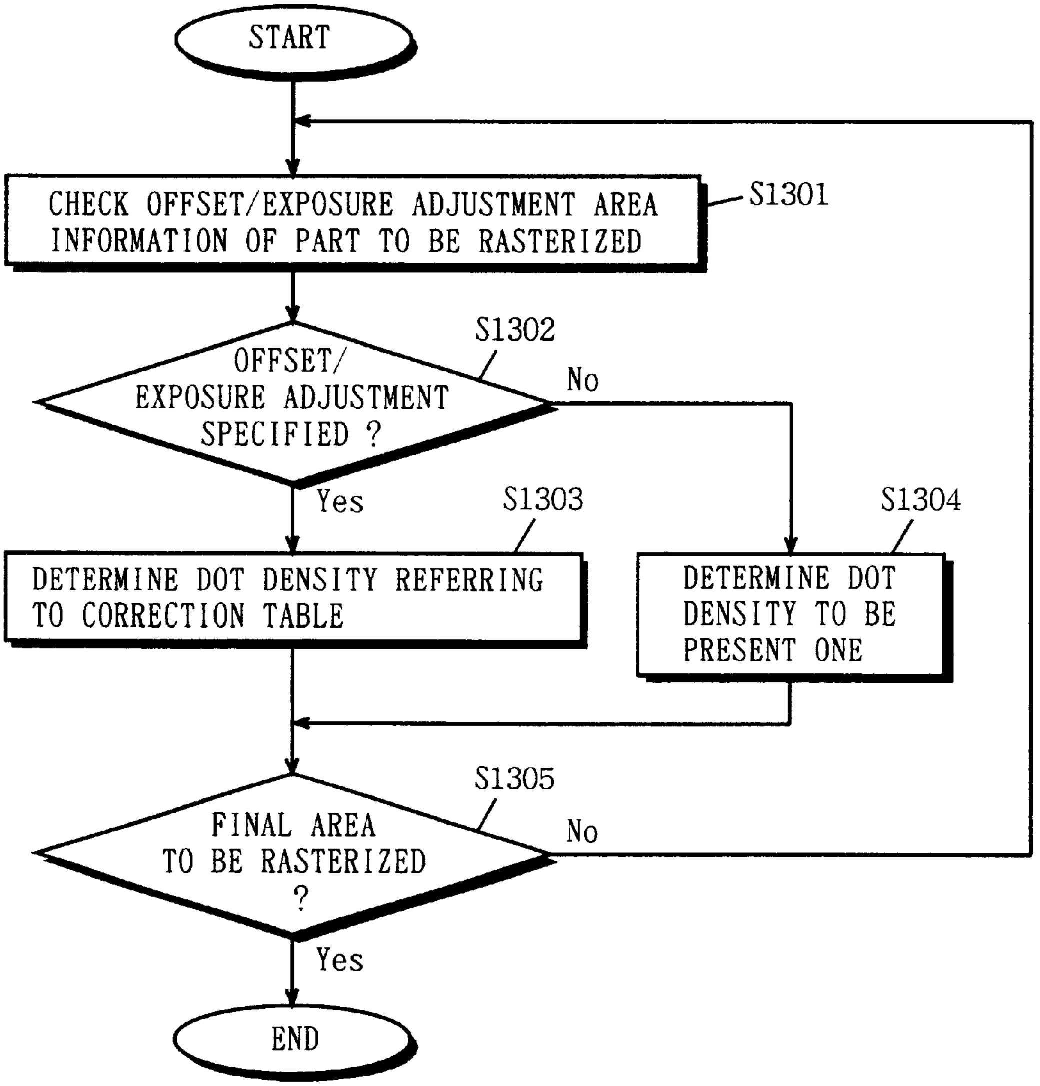
FIG. 15 is a flow chart of processing in step S816 in FIG. 11.

Next, the raster image data constructed in step S815 is rasterized to generate dots (step S816). Dot generation in step S816 is performed by processing shown in FIG. 15. FIG. 15 is a flow chart of processing at the time of dot generation.

Referring to FIG. 15, offset/exposure adjustment area information of a part to be rasterized is checked (step S1301). Then, it is determined whether or not offset/exposure adjustment is specified (that is, exposure adjustment is specified) (step S1302). As a result of determination, when offset/exposure adjustment is specified, dot density is determined referring to the above correction table (step S1303). On the other hand, when offset/exposure adjustment is not specified, dot density is determined to be the present dot density without correction (step S1304). Then, the above processing is repeated until rasterization is finished (step S1305). Although not shown, at the time of dot generation, calibration of the printer for printing is performed and also dot gain adjustment is added according to the printer.

Referring to FIG. 11 again, a printing plate is made based on the above generated dots (step S817). Then, printing is performed using this printing plate (step S818). Here, as confirmation in the final step, print condition of the printed matter is checked (step S819). When there is no problem in print condition, printing continues (step S820). When there is a problem in the print condition, offset/exposure is re-adjusted and then the raster image is reconstructed to make a printing plate again (step S808 to S815).

As described above, the digital impositioning apparatus 1 according to the second embodiment of the present invention digitally performs offset/exposure adjustment, which is conventionally performed in an analog fashion by handwork using films, using the rasterized file 201 composed of the RIP file 202 and the arrangement information 203.

Therefore, the digital impositioning apparatus 1 according to the second embodiment of the present invention can reliably and quickly perform offset/exposure adjustment by relative changing processing of digital data (numerical value input or instruction) without depending on techniques and experiences of skilled workers. This can achieve labor savings in Plate Making/Printing process as well as improvement in printing accuracy.

(Third Embodiment)

A third embodiment of the present invention realizes offset/exposure adjustment performed by the digital impositioning apparatus according to the second embodiment, using not the rasterized file but a page data (data for each page created with a page description language) file before RIP operation.

Figure 16:
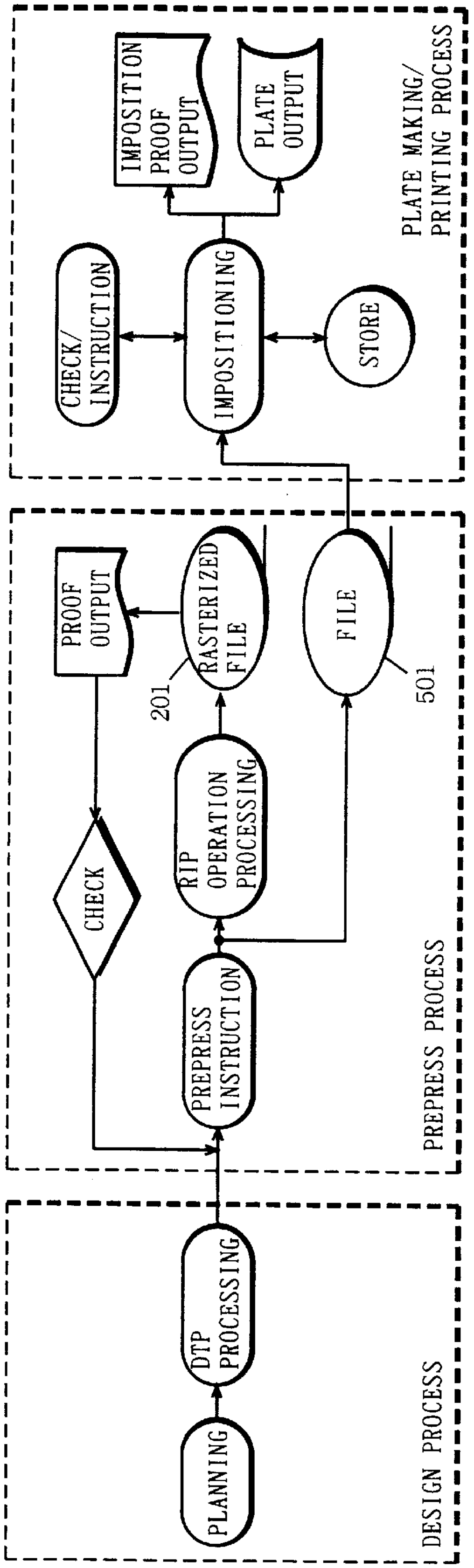
FIG. 16 is a block diagram showing the structure of a processing system using the digital impositioning apparatus according to the third embodiment of the present invention.

Therefore, as shown in FIG. 16, the structure of processing system using the digital impositioning apparatus according to the third embodiment of the present invention is basically the same as the structure shown in the first embodiment (refer to FIG. 1), while a file configuration for use in impositioning is different.

Furthermore, in the third embodiment of the present invention, the structure of the digital impositioning apparatus (refer to FIG. 4), and the flow of processing in Plate Making/Printing process (refer to FIG. 11) are the same as those described in the first and second embodiments.

Therefore, description below in sequence concentrates on parts in which the digital impositioning apparatus according to the third embodiment is different from the digital impositioning apparatus according to the second embodiment.

First, before the digital impositioning apparatus according to the third embodiment of the present invention is described, the data structure of the page description language file used for the digital impositioning apparatus is described.

Figure 17:
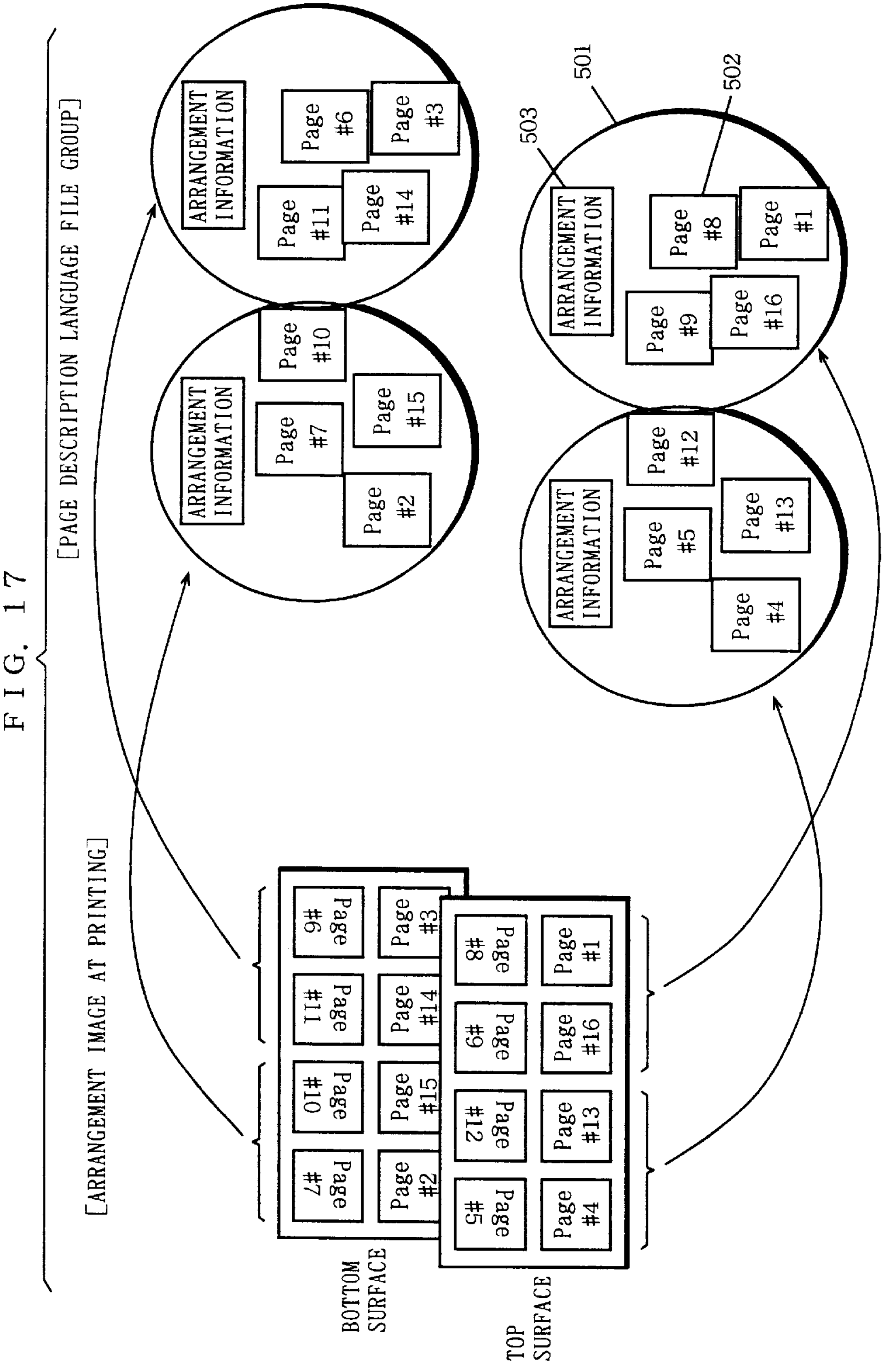
FIG. 17 is a diagram showing an example of data structure of page description language files in FIG. 16.

An example of data structure of a page description language file 501 is shown in FIG. 17. The page description language file 501 in FIG. 17 has basically the same structure as that of the rasterized file 201 in FIG. 2, composed of two types of data: one is page description language data 502 and the other is arrangement information 503 about the data.

The page description language data 502 is a file of digital page data created with a page description language (that is, a file before RIP operation processing). As shown in FIG. 17, the page description language data 502 is also created for each page as in the above RIP file 202.

Figure 18:
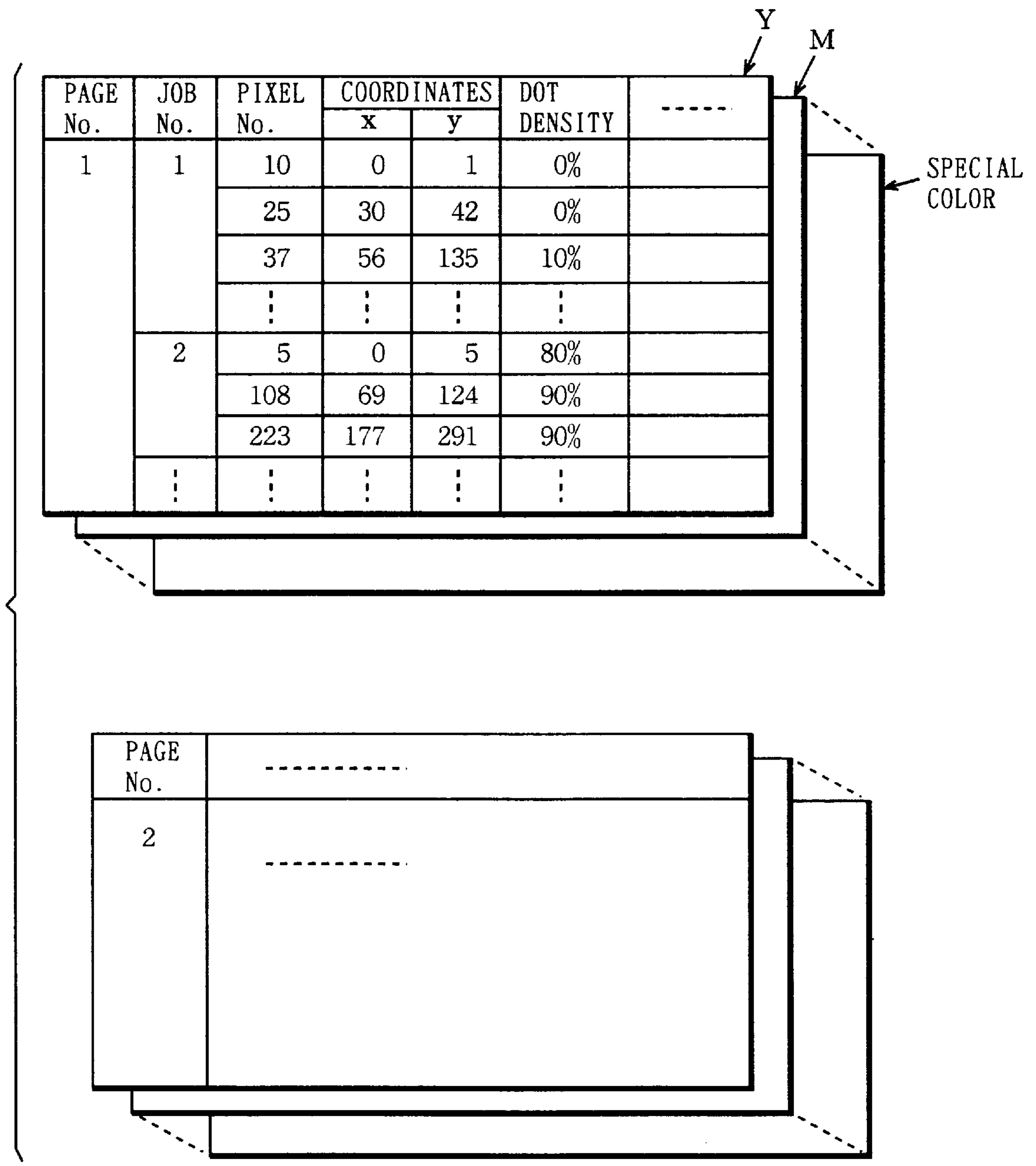
FIG. 18 is a diagram showing an example of data structure of page description language data 502.

An example of data list constructed in the above page description language data 502 is shown in FIG. 18. In FIG. 18, first written in the data list is a page number of the page description language data 502. Each data item is constructed in a "job" unit. The job is a structural unit of work (data), and for example, pictures, graphics (components), partial areas and the like can be combined as one job. Therefore, written is data such as a pixel number, coordinate values (values relating to origin coordinates of the arrangement information 503), tone density and the like, which constructs each job. Practically, for the page description language data 502, like the RIP file 202, a data list is constructed for each separation (Y, M, C, K and special color) with respect to one page number.

The arrangement information 503 exists for each page description language file 501 and is data as to arrangement (on a printing plate) of a plurality of pages included in the page description language file 501, that is, the page description language data 502. The arrangement information 503 in the page description language file 501 has the same structure as that of the arrangement information 203 in the above described rasterized file 201 (refer to FIG. 10), and therefore its description is omitted. As the page description language, "PostScript (a registered trademark of Adobe Systems)" and the like can be used.

Figure 19A:
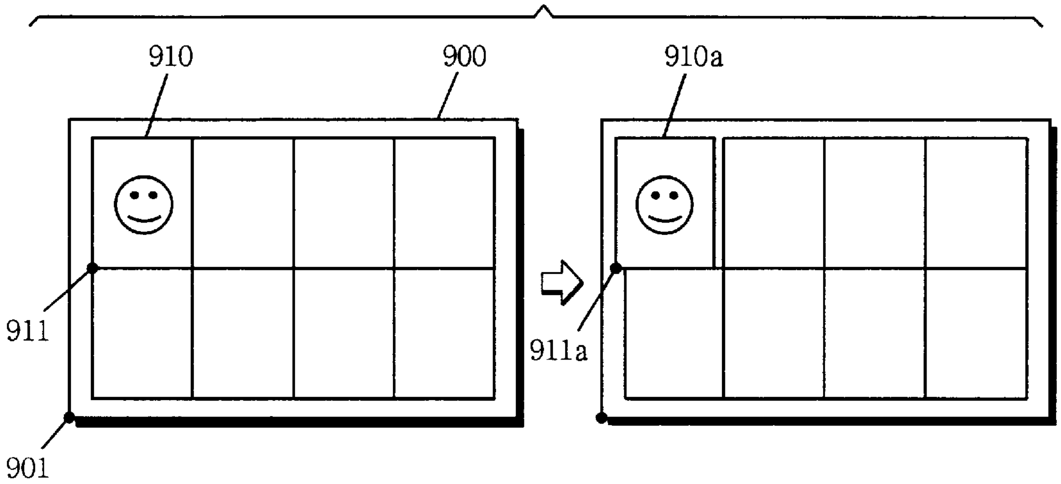
FIGS. 19*a* and 19*b* are diagrams showing an example of offset adjustment and exposure adjustment in the digital impositioning apparatus according to the third embodiment of the present invention.

First, offset adjustment is, as shown in FIG. 19*a*, to adjust a position of page data 910 (corresponding to the page description language data 502) on the printing paper 900. This adjustment is performed by changing relative values between origin coordinates 901 of a finish frame (in FIG. 19*a*, a lower-left corner of the printing paper 900) and origin coordinates 911 of the page data 910 to be subjected to offset adjustment. The operator only makes an instruction as to the origin coordinates 911 when performing offset adjustment. Specifically, the values of the origin coordinates (x, y) in the arrangement information 203 shown in FIG. 10 are rewritten. This, as shown in FIG. 19*a*, moves the position of the entire page data 910 to a position of page data 910*a*.

Next, in exposure adjustment, when the file for use in adjustment is the page description language file 501 instead of the rasterized file 201, the unit (area) for which exposure adjustment can be made is limited.

Figure 19B:
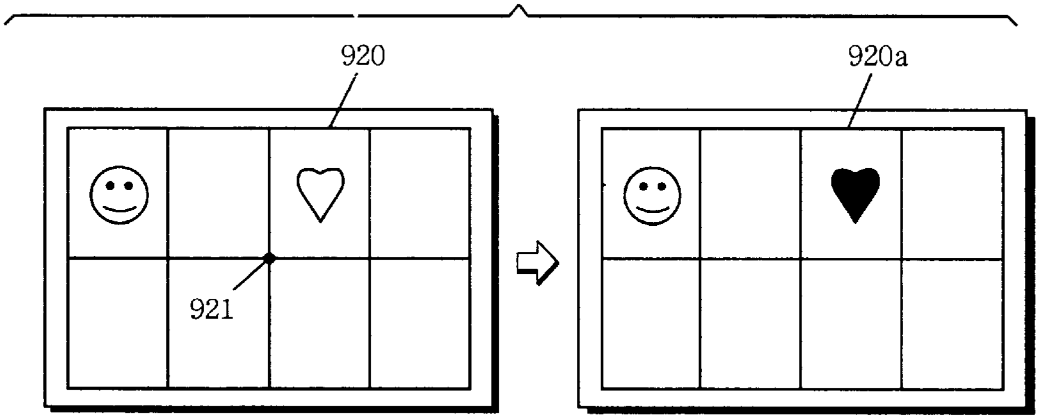
Figure 20:
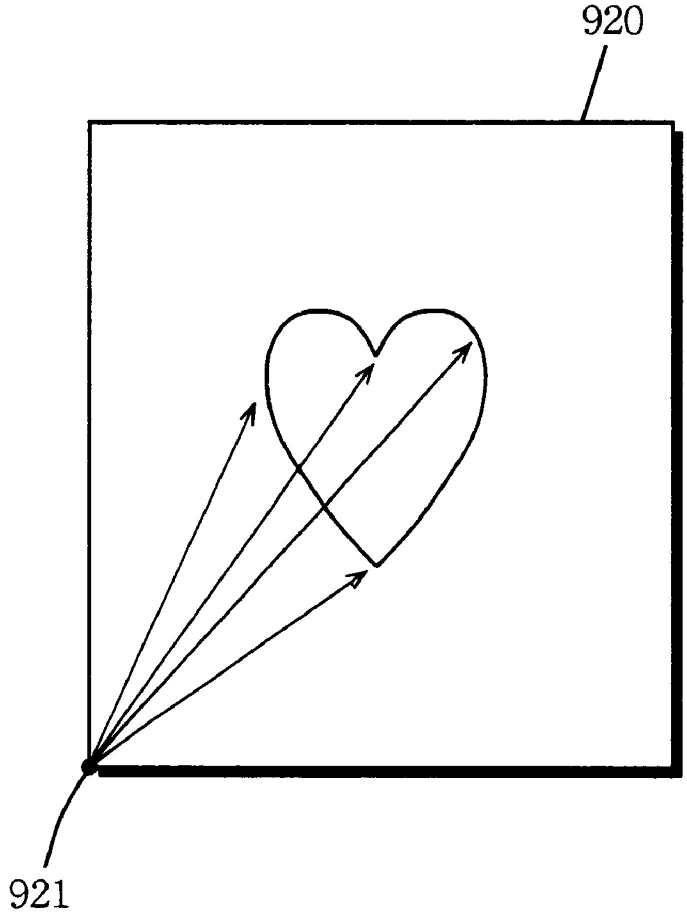
FIG. 20 is an example of vector data of a component to be subjected to partial exposure adjustment.

In the case of the page description language file 501, in addition to adjustment in a page data unit as described above, partial exposure adjustment of adjusting in a certain part (component such as pictures) unit in the page data is possible. This is because the page description language data 502 is written in a "job" unit that is a collection of a plurality of vector data items for each component (refer to FIG. 18 and FIG. 20). Thus, for example, it is possible to specify a closed loop area formed by vector data such as only an inner portion of a heart mark picture in the page data 920 in FIG. 19*b* and the like and perform density correction. Therefore, when performing partial exposure adjustment of the heart mark picture, the operator only specifies the closed loop formed by the vector data which constructs the heart mark picture. Specifically, partial exposure adjustment is performed by specifying the job unit shown in FIG. 18. This allows density correction for each component (page data 920*a* in FIG. 19*b*).

After the area to be subjected to exposure adjustment is specified by the above method, as described in the second embodiment, correction of exposure density in the area is performed.

For impositioning using the page description language file 501, The RIP operation processing is not performed until processing reaches step S815 in FIG. 11. In this case, since means for RIP operation are required individually for both Prepress process and Plate Making/Printing process, a method may be adopted that the page description language file 501 after the processing in step S814 is returned again to Prepress process to be subjected to RIP operation processing by RIP operation means included in Prepress process, and then returned again to Plate Making/Printing process after the processing.

As described above, the digital impositioning apparatus 1 according to the third embodiment of the present invention digitally performs offset/exposure adjustment, which is conventionally performed in an analog fashion by handwork using films, using the page description language file 501 composed of the page description language data 502 and the arrangement information 503.

Accordingly, the digital impositioning apparatus 1 according to the third embodiment of the present invention can reliably and quickly perform offset/exposure adjustment by relative changing processing of digital data (numerical value input or instruction) without depending on techniques and experiences of skilled workers. This can achieve labor savings in Plate Making/Printing process as well as improvement in printing accuracy.

Figure 21:
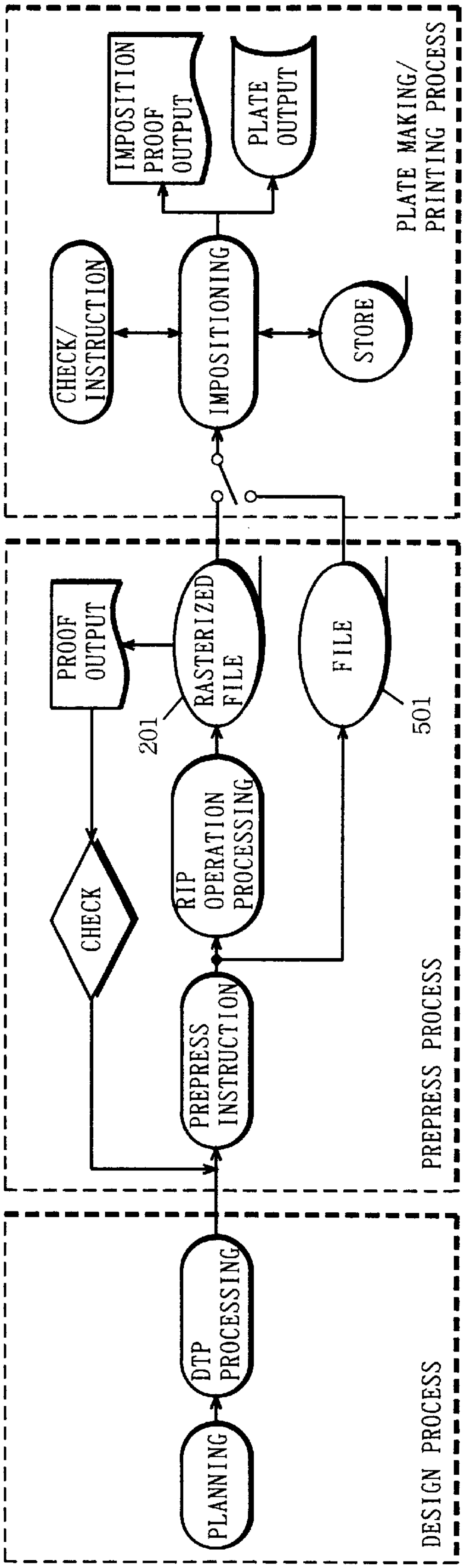
FIG. 21 is a block diagram showing the structure of a processing system using another digital impositioning apparatus according to the second and third embodiments of the present invention.
Figure 22:
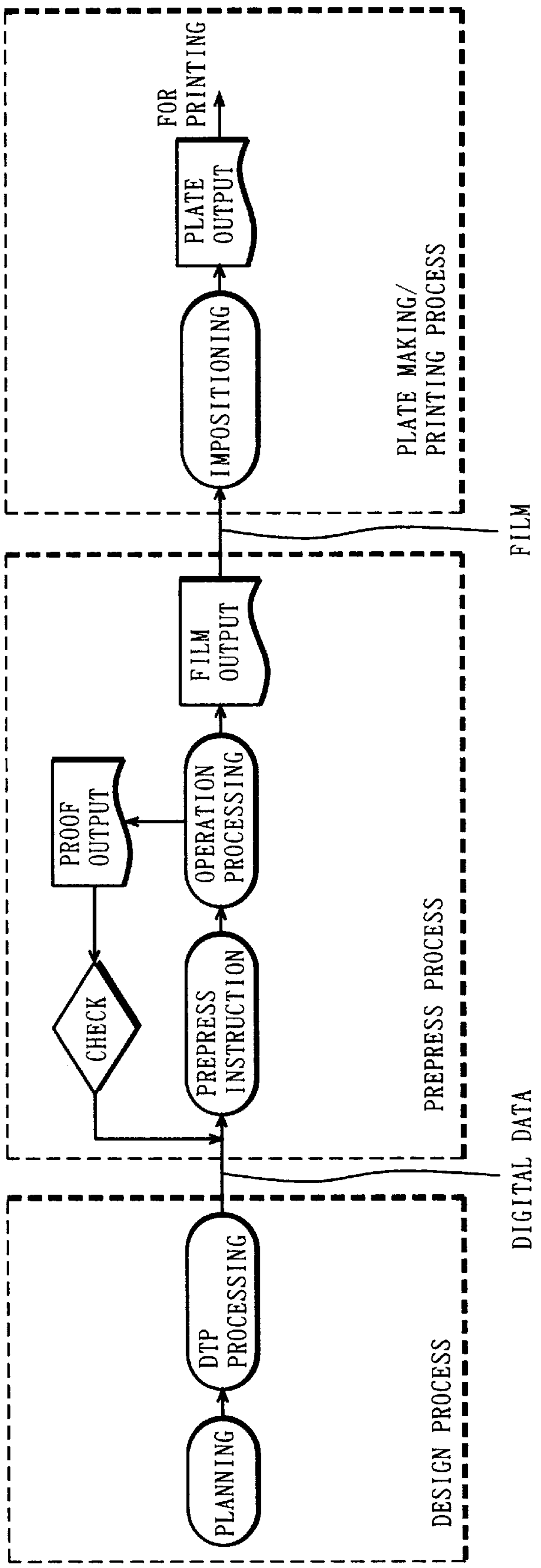
FIG. 22 PRIOR ART
FIG. 22 is a block diagram showing an example of structure of a conventional processing system using films.
Figure 23:
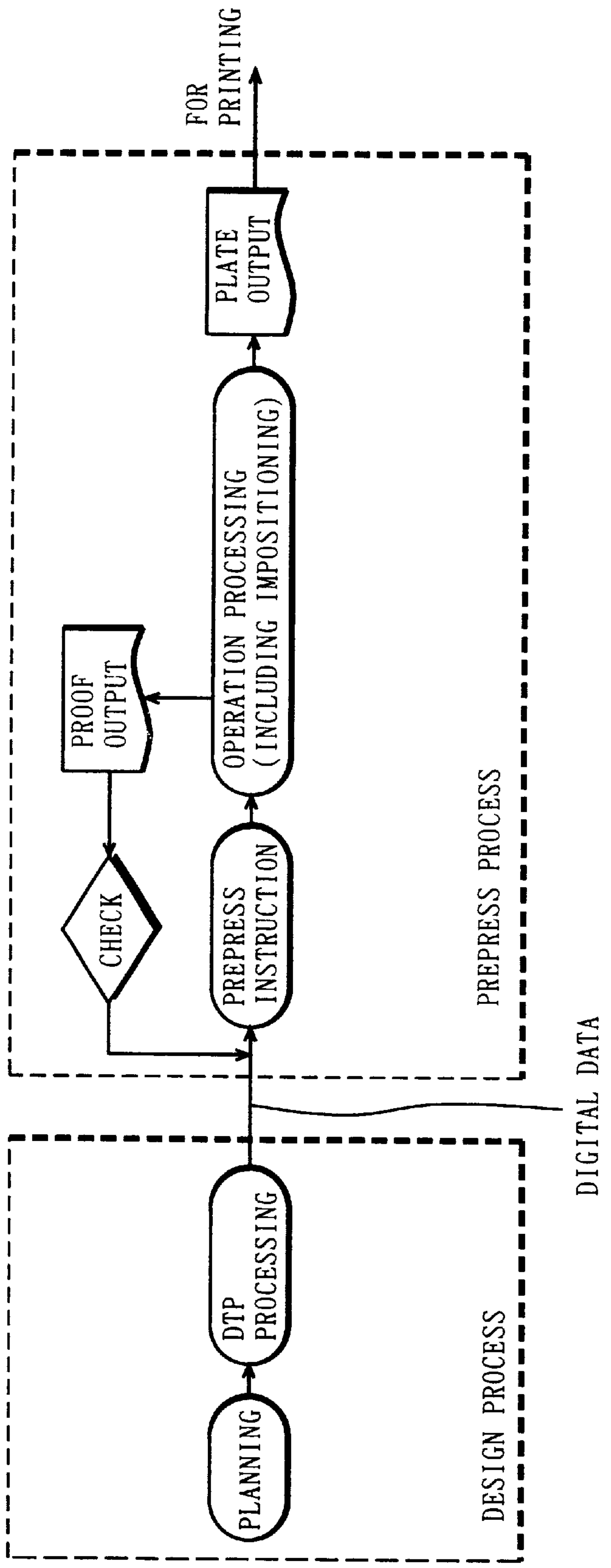
FIG. 23 PRIOR ART
FIG. 23 is a block diagram showing an example of structure of a conventional processing system using a CTP method.

The digital impositioning apparatus 1 according to the second and third embodiments has been described assuming that it uses either one of the rasterized file 201 or the page description language file 501. However, as another embodiment of the present invention, as shown in FIG. 21, a structure may be used in which the rasterized file 201 and the page description language file 501 can be arbitrarily selected according to a use purpose.

While the invention has been described in detail, the foregoing description is in all aspects illustrative and not restrictive. It is understood that numerous other modifications and variations can be devised without departing from the scope of the invention.

What is claimed is:

1. A digital impositioning apparatus for performing impositioning in an electronic data form in Plate Making/Printing process using a rasterized file received from Prepress process, said rasterized file including:

one or more RIP files created by performing RIP operation without screening to page data created corresponding to each of at least one page, each of said RIP files having at least dot density data corresponding to each pixel in the page; and arrangement information as to an arrangement position of all or part of said RIP files, said arrangement information having at least page origin data of an arrangement reference for each data item in said RIP file, the apparatus comprising:

means for performing offset adjustment in a unit of said RIP file by determining arrangement of said page origin of said arrangement information relatively to a position of an origin of a reference of a finish frame;

means for performing exposure adjustment in the unit of the RIP file by changing density of each dot in said RIP file using a correction table;

impositioning means for creating raster data in which said RIP files are arranged on one surface under bookbinding rules by rewriting said arrangement information; and screening means for performing screening to said raster data created by said impositioning means.

2. The digital impositioning apparatus according to claim 1, wherein when said impositioning means creates said raster data, print additional information required for printing is arranged on said raster data.

3. The digital impositioning apparatus according to claim 1, wherein when performing screening to said raster data, said screening means performs screening for proof subjected to color matching.

4. The digital impositioning apparatus according to claim 1, wherein when performing screening to said raster data, said screening means performs adjustment at the time of output to said RIP files for one page composing said raster data.

5. A digital impositioning apparatus for performing impositioning in an electronic data form in Plate Making/Printing process using a plurality of rasterized files received from Prepress process, said rasterized file including:

one or more RIP files created by performing RIP operation without screening to page data created corresponding to each of at least one page, each of said RIP files having at least dot density data corresponding to each pixel in the page; and arrangement information as to an arrangement position of all or part of said RIP files, said arrangement information having at least page origin data of an arrangement reference for each data item in said RIP file, the apparatus comprising:

means for performing offset adjustment in a unit of said RIP file by determining arrangement of said page origin of said arrangement information relatively to a position of an origin of a reference of a finish frame;

means for performing exposure adjustment in the unit of the RIP file by changing density of each dot in said RIP file using a correction table;

impositioning means for creating raster data in which said RIP files are arranged on one surface under bookbinding rules by rewriting said arrangement information; and screening means for performing screening to said raster data created by said impositioning means.

6. The digital impositioning apparatus according to claim 5, wherein when said impositioning means creates said raster data, print additional information required for printing is arranged on said raster data.

7. The digital impositioning apparatus according to claim 5, wherein when performing screening to said raster data, said screening means performs screening for proof subjected to color matching.

8. The digital impositioning apparatus according to claim 5, wherein when performing screening to said raster data, said screening means performs adjustment at the time of output to said RIP files for one page composing said raster data.

9. A digital impositioning apparatus for performing impositioning in an electronic data form in Plate Making/Printing process using a page description language file received from Prepress process, said page description language file including:

page description language data created with a page description language corresponding to each of at least one page, having at least dot density data corresponding to each pixel in the page; and arrangement information as to all or part of said page description language data, having at least page origin data of an arrangement reference for each data item in the page description language data, the apparatus comprising:

means for performing offset adjustment in a unit of said page description language data by determining arrangement of said page origin of said arrangement information relatively to a position of an origin of a reference of a finish frame; and means for performing exposure adjustment in the unit of the page description language data by changing density of each dot in said page description language data using a correction table, wherein said page description language data further has vector data representing a component structured in the page description language data, and said means for performing exposure adjustment specifies an arbitrary component using said vector data when changing density of each dot in said page description language data using said correction table, thereby allowing exposure adjustment in a component unit in the page description language data.

10. A computer-readable recording medium recording a program to be executed in a computer apparatus, the program being for realizing on said computer apparatus an operating environment including:

for a rasterized file including one or more RIP files created by performing RIP operation without screening to page data created corresponding to each of at least one page, each of said RIP files having at least dot density data corresponding to each pixel in the page, and arrangement information as to an arrangement position of all or part of the RIP files, said arrangement information having at least page origin data of an arrangement reference for each data item in said RIP file, a step of performing offset adjustment in a unit of said RIP file by determining arrangement of said page origin of said arrangement information relatively to a position of an origin of a reference of a finish frame;

a step of performing exposure adjustment in the unit of the RIP file by changing density of each dot in said RIP file using a correction table;

an impositioning step for creating raster data in which said RIP files are arranged on one surface under bookbinding rules by rewriting said arrangement information; and a screening step for performing screening to said raster data created by said impositioning step.

11. A computer-readable recording medium recording a program to be executed in a computer apparatus, the program being for realizing on said computer apparatus an operating environment including:

for a plurality of rasterized files including one or more RIP files created by performing RIP operation without screening to page data created corresponding to each of at least one page, each of said RIP files having at least dot density data corresponding to each pixel in the page, and arrangement information as to an arrangement position of all or part of the RIP files, said arrangement information having at least page origin data of an arrangement reference for each data item in said RIP file, a step of performing offset adjustment in a unit of said RIP file by determining arrangement of said page origin of said arrangement information relatively to a position of an origin of a reference of a finish frame;

a step of performing exposure adjustment in the unit of the RIP file by changing density of each dot in said RIP file using a correction table;

an impositioning step for creating raster data in which said RIP files are arranged on one surface under bookbinding rules by rewriting said arrangement information; and a screening step for performing screening to said raster data created by said impositioning step.

12. A computer-readable recording medium recording a program to be executed in a computer apparatus, the program being for realizing on said computer apparatus an operating environment including the steps of:

for a page description language file including page description language data created with a page description language corresponding to each of at least one page, having at least dot density data corresponding to each pixel in the page; and arrangement information as to all or part of the page description data, having at least page origin data of an arrangement reference for each data item in the page description language data, performing offset adjustment in a unit of said page description language data by determining arrangement of said page origin of said arrangement information relatively to a position of an origin of a reference of a finish frame; and performing exposure adjustment in the unit of the page description language data by changing density of each dot in said page description language data using a correction table, said page description language data further has vector data representing a component structured in the page description language data, and said step of performing exposure adjustment specifies an arbitrary component using said vector data when changing density of each dot in said page description language data using said correction table, thereby allowing exposure adjustment in a component unit in the page description language data.

13. A digital impositioning apparatus for performing impositioning in an electronic data form in Plate Making/Printing process using a rasterized file or a page description language file received from Prepress process, said rasterized file including:

one or more RIP files created by performing RIP operation to page data created corresponding to each of at least one page, having at least dot density data corresponding to each pixel in the page; and arrangement information as to all or part of said RIP files, having at least page origin data of an arrangement reference for each data item in the RIP file, said page description language file including:

page description language data created with a page description language corresponding to each of at least one page, having at least dot density data corresponding to each pixel in the page; and arrangement information as to all or part of said page description data, having at least page origin data of an arrangement reference for each data item in the page description language data, the apparatus comprising:

selecting means for inputting both of said rasterized file and said page description language file, and selecting and then outputting either one of the both files;

means for performing offset adjustment in a unit of the RIP file or the page description language data by determining arrangement of said page origin of said arrangement information in the file selected in said selecting means relatively to a position of an origin of a reference of a finish frame; and means for performing exposure adjustment in the unit of the RIP file or the page description language data by changing density of each dot in said RIP file or said page description language data using a correction table.

14. The digital impositioning apparatus according to claim 13, wherein said page description language data further has vector data representing a component structured in the page description language data, and when said selecting means selects said page description language file, said means for performing exposure adjustment specifies an arbitrary component using said vector data when changing density of each dot in said page description language data, thereby allowing exposure adjustment in a component unit in the page description language data.

* * * * *